(12) United States Patent
Molin et al.

(10) Patent No.: US 8,891,074 B2
(45) Date of Patent: Nov. 18, 2014

(54) MULTIMODE OPTICAL FIBER INSENSITIVE TO BENDING LOSSES

(75) Inventors: Denis Molin, Draveil (FR); Pierre Sillard, Le Chesnay (FR)

(73) Assignee: Draka Comteq, B.V., Amsterdam (NL)

( * ) Notice: Subject to any disclaimer, the term of this patent is extended or adjusted under 35 U.S.C. 154(b) by 265 days.

(21) Appl. No.: 13/275,921

(22) Filed: Oct. 18, 2011

(65) Prior Publication Data
US 2012/0092651 A1    Apr. 19, 2012

(30) Foreign Application Priority Data

Oct. 18, 2010   (FR) ..................................... 10/58485
Jul. 27, 2011    (FR) ..................................... 11/56877

(51) Int. Cl.
| | |
|---|---|
| G01N 21/00 | (2006.01) |
| G01M 11/00 | (2006.01) |
| G02B 6/028 | (2006.01) |
| G01M 11/08 | (2006.01) |
| G02B 6/036 | (2006.01) |

(52) U.S. Cl.
CPC ........... *G02B 6/0288* (2013.01); *G01M 11/338* (2013.01); *G01M 11/088* (2013.01); *G02B 6/03638* (2013.01)
USPC ...................................................... 356/73.1

(58) Field of Classification Search
USPC ........................................................ 356/73.1
See application file for complete search history.

(56) References Cited

U.S. PATENT DOCUMENTS

| | | | |
|---|---|---|---|
| 4,111,525 A | 9/1978 | Kaminow et al. | |
| 4,184,744 A | 1/1980 | Onoda et al. | |
| 4,222,631 A | 9/1980 | Olshansky | |
| 4,229,070 A | 10/1980 | Olshansky et al. | |
| 4,230,396 A | 10/1980 | Olshansky et al. | |
| 4,339,174 A | 7/1982 | Levin | |
| 4,406,517 A | 9/1983 | Olshansky | |

(Continued)

FOREIGN PATENT DOCUMENTS

| | | |
|---|---|---|
| EP | 1921478 A1 | 5/2008 |
| EP | 2166386 A1 | 3/2010 |

(Continued)

OTHER PUBLICATIONS

Kolesar et al., "Understanding Multimode Bandwidth and Differential Mode Delay Measurements and Their Applications," Proceedings of the 51st Int'l Wire and Cable Symposium, 2002, pp. 453-460.

(Continued)

*Primary Examiner* — Tarifur Chowdhury
*Assistant Examiner* — Omar Nixon
(74) *Attorney, Agent, or Firm* — Additon, Higgins & Pendleton, P.A.

(57) ABSTRACT

A method of selecting a multimode optical fiber includes determining a first modal bandwidth value BW for each of a plurality of multimode optical fibers in a straight position and determining a second modal bandwidth value bBW for each of a plurality of multimode optical fibers in a bent position. Typically, the method includes selecting the multimode optical fibers for which the second modal bandwidth value bBW is greater than a threshold bandwidth A. The threshold bandwidth A may be (i) a function of the multimode optical fiber's first modal bandwidth value BW and a bending-loss value BL and (ii) greater than the multimode optical fiber's first modal bandwidth value BW.

27 Claims, 7 Drawing Sheets

(56) References Cited

U.S. PATENT DOCUMENTS

| | | |
|---|---|---|
| 4,465,335 A | 8/1984 | Eppes |
| 4,636,235 A | 1/1987 | Glessner et al. |
| 4,636,236 A | 1/1987 | Glessner et al. |
| 4,653,042 A | 3/1987 | d'Auria et al. |
| 4,715,695 A | 12/1987 | Nishimura et al. |
| 4,723,828 A | 2/1988 | Garel-Jones et al. |
| 4,838,643 A | 6/1989 | Hodges et al. |
| 5,142,603 A | 8/1992 | Forrester |
| 5,194,714 A | 3/1993 | Le Sergent |
| 5,278,687 A | 1/1994 | Jannson et al. |
| 5,381,503 A | 1/1995 | Kanamori et al. |
| 5,522,007 A | 5/1996 | Drouart et al. |
| 5,574,816 A | 11/1996 | Yang et al. |
| 5,702,497 A | 12/1997 | Oh et al. |
| 5,717,805 A | 2/1998 | Stulpin |
| 5,761,362 A | 6/1998 | Yang et al. |
| 5,841,933 A | 11/1998 | Hoaglin et al. |
| 5,911,023 A | 6/1999 | Risch et al. |
| 5,982,968 A | 11/1999 | Stulpin |
| 6,002,818 A | 12/1999 | Fatehi et al. |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,185,346 B1 | 2/2001 | Asawa et al. |
| 6,202,447 B1 | 3/2001 | Drouart et al. |
| 6,210,802 B1 | 4/2001 | Risch et al. |
| 6,215,931 B1 | 4/2001 | Risch et al. |
| 6,269,663 B1 | 8/2001 | Drouart et al. |
| 6,292,603 B1 | 9/2001 | Mizuochi et al. |
| 6,292,612 B1 | 9/2001 | Golowich et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,470,126 B1 | 10/2002 | Mukasa |
| 6,490,398 B2 | 12/2002 | Gruner-Nielsen et al. |
| 6,493,491 B1 | 12/2002 | Shen et al. |
| 6,580,863 B2 | 6/2003 | Yegnanarayanan et al. |
| 6,603,908 B2 | 8/2003 | Dallas et al. |
| 6,606,437 B1 | 8/2003 | Mukasa et al. |
| 6,618,534 B2 | 9/2003 | Abbott, III et al. |
| 6,618,538 B2 | 9/2003 | Nechitailo et al. |
| 6,658,184 B2 | 12/2003 | Bourget et al. |
| 6,724,965 B2 | 4/2004 | Abbott et al. |
| 6,724,966 B2 | 4/2004 | Mukasa |
| 6,735,985 B2 | 5/2004 | DiGiovanni et al. |
| 6,749,446 B2 | 6/2004 | Nechitailo |
| 6,750,294 B2 | 6/2004 | Sugiyama et al. |
| 6,771,865 B2 | 8/2004 | Blaszyk et al. |
| 6,904,218 B2 | 6/2005 | Sun et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,006,751 B2 | 2/2006 | Provost et al. |
| 7,043,126 B2 | 5/2006 | Guan et al. |
| 7,043,128 B2 | 5/2006 | DiGiovanni et al. |
| 7,045,010 B2 | 5/2006 | Sturman, Jr. |
| 7,089,765 B2 | 8/2006 | Schaper et al. |
| 7,162,128 B2 | 1/2007 | Lovie et al. |
| 7,228,032 B2 | 6/2007 | Blauvelt et al. |
| 7,315,677 B1 | 1/2008 | Li et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,400,835 B2 | 7/2008 | Sardesai et al. |
| 7,406,235 B2 | 7/2008 | Guan et al. |
| 7,421,172 B2 | 9/2008 | Matthijse et al. |
| 7,421,174 B2 | 9/2008 | Fleming, Jr. et al. |
| 7,483,612 B2 | 1/2009 | Digiovanni et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,539,381 B2 | 5/2009 | Chen et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,574,095 B2 | 8/2009 | Lock et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,646,955 B2 | 1/2010 | Donlagic |
| 7,665,902 B2 | 2/2010 | Griffioen et al. |
| 7,702,204 B2 | 4/2010 | Gonnet et al. |
| 7,724,998 B2 | 5/2010 | Parris et al. |
| 7,783,149 B2 | 8/2010 | Fini |
| 7,787,731 B2 | 8/2010 | Bookbinder et al. |
| 7,817,257 B2 | 10/2010 | Takenaga et al. |
| 7,817,891 B2 | 10/2010 | Lavenne et al. |
| 7,826,691 B2 | 11/2010 | Matthijsse et al. |
| 7,865,050 B1 | 1/2011 | Sun et al. |
| 7,878,712 B2 | 2/2011 | Shimotakahara et al. |
| 7,889,960 B2 | 2/2011 | de Montmorillon et al. |
| 7,903,918 B1 | 3/2011 | Bickham et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,081,853 B2 | 12/2011 | Overton |
| 8,145,027 B2 | 3/2012 | Overton et al. |
| 8,184,936 B2 | 5/2012 | Zhang et al. |
| 2002/0102082 A1 | 8/2002 | Sarchi et al. |
| 2002/0176678 A1 | 11/2002 | Mukasa |
| 2002/0197038 A1 | 12/2002 | Abbott et al. |
| 2003/0024276 A1 | 2/2003 | Anderson et al. |
| 2004/0247269 A1 | 12/2004 | Hirano et al. |
| 2005/0008312 A1 | 1/2005 | Jang et al. |
| 2006/0039665 A1 | 2/2006 | Matsuo et al. |
| 2007/0172182 A1 | 7/2007 | Lee et al. |
| 2008/0056658 A1* | 3/2008 | Bickham et al. ............ 385/127 |
| 2008/0166094 A1 | 7/2008 | Bookbinder et al. |
| 2008/0292262 A1 | 11/2008 | Overton et al. |
| 2009/0010596 A1 | 1/2009 | Matthijsse et al. |
| 2009/0059353 A1 | 3/2009 | Fini |
| 2009/0060437 A1 | 3/2009 | Fini et al. |
| 2009/0092365 A1 | 4/2009 | Donlagic |
| 2009/0154888 A1 | 6/2009 | Abbott, III et al. |
| 2009/0169163 A1 | 7/2009 | Abbott, III et al. |
| 2009/0175583 A1 | 7/2009 | Overton |
| 2009/0214167 A1 | 8/2009 | Lookadoo et al. |
| 2009/0279833 A1 | 11/2009 | Overton et al. |
| 2009/0279835 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0040336 A1 | 2/2010 | Chen et al. |
| 2010/0067858 A1 | 3/2010 | Kim et al. |
| 2010/0092135 A1 | 4/2010 | Barker et al. |
| 2010/0092138 A1 | 4/2010 | Overton |
| 2010/0118388 A1 | 5/2010 | Pastouret et al. |
| 2010/0119202 A1 | 5/2010 | Overton |
| 2010/0135624 A1 | 6/2010 | Overton et al. |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |

(56) References Cited

U.S. PATENT DOCUMENTS

| | | |
|---|---|---|
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0220966 A1 | 9/2010 | Bennett |
| 2010/0254653 A1 | 10/2010 | Molin et al. |
| 2010/0310218 A1 | 12/2010 | Molin et al. |
| 2011/0002590 A1 | 1/2011 | Ooizumi et al. |
| 2011/0026889 A1 | 2/2011 | Risch et al. |
| 2011/0037183 A1 | 2/2011 | Tudury et al. |
| 2011/0044594 A1 | 2/2011 | Tudury et al. |
| 2011/0044596 A1 | 2/2011 | Zhang et al. |
| 2011/0054861 A1 | 3/2011 | Lane |
| 2011/0054862 A1 | 3/2011 | Pimpinella et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0085770 A1 | 4/2011 | Bigot-Astruc et al. |
| 2011/0088433 A1* | 4/2011 | Allegretto et al. .............. 65/378 |
| 2011/0091171 A1 | 4/2011 | Tatat et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2011/0305423 A1 | 12/2011 | Molin et al. |
| 2012/0009358 A1 | 1/2012 | Gharbi et al. |
| 2012/0014652 A1 | 1/2012 | Parris |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |
| 2012/0092651 A1 | 4/2012 | Molin et al. |
| 2012/0195549 A1 | 8/2012 | Molin et al. |
| 2012/0195561 A1 | 8/2012 | Molin et al. |
| 2012/0243843 A1 | 9/2012 | Molin et al. |
| 2012/0251062 A1 | 10/2012 | Molin et al. |

FOREIGN PATENT DOCUMENTS

| | | |
|---|---|---|
| EP | 2447749 A1 | 5/2012 |
| JP | 06-216440 A | 8/1994 |
| JP | 08-304636 A | 11/1996 |
| JP | 09-048629 | 2/1997 |
| JP | 11-064665 A | 3/1999 |
| JP | 2000-347057 A2 | 12/2000 |
| JP | 2001-235648 | 8/2001 |
| JP | 2002-318315 A | 10/2002 |
| JP | 2006-047719 A | 2/2006 |
| JP | 2006-078543 A | 3/2006 |
| JP | 2006-227173 A | 8/2006 |
| JP | 2007-272239 | 10/2007 |
| JP | 2007-272239 A | 10/2007 |
| WO | 03/081301 A1 | 10/2003 |
| WO | 2005/106544 A1 | 11/2005 |
| WO | 2008/085851 A1 | 7/2008 |
| WO | 2009/062131 A2 | 5/2009 |
| WO | 2009/078962 A1 | 6/2009 |
| WO | 2010/036684 A2 | 4/2010 |
| WO | 2011/040830 A1 | 4/2011 |

OTHER PUBLICATIONS

Coleman et al., "Calculated EMB Enhances 10GbE Performance Reliability for Laser-Optimized 50/125 μm Multimode Fiber," Corning Cable Systems Whitepaper (Mar. 2005).

Molin et al., "Low Bending Sensitivity of Regular OM3/OM4 Fibers in 10GbE Applications", Optical Fiber Communication (OFC) Collocated National Fiber Optic Engineers Conference, 2010 Conference on (OFC/NFOEC), IEEE, Piscataway, NJ, Mar. 21, 2010, pp. 1-3.

European Search Report and Written Opinion in counterpart European Application No. 11185675.3 dated Apr. 4, 2012, pp. 1-6.

Yabre, "Comprehensive Theory of Dispersion in Graded-Index Optical Fibers", Journal of Lightwave Technology, Feb. 2000, vol. 18, No. 2, pp. 166-177.

Molin et al., "Trench-Assisted Bend-Resistant OM4 Multi-Mode Fibers", International Wire & Cable Symposium, Proceedings of the 59th IWCS/IICIT, pp. 439-443.

French Search Report in counterpart French Application No. 1058485 dated Apr. 29, 2011, pp. 1-9.

Office Action in counterpart European Application No. 11185675.3 dated Oct. 30, 2012, pp. 1-4.

Result of Consultation in counterpart European Application No. 11185675.3 dated Dec. 2, 2012, pp. 1-3.

Result of Consultation in counterpart European Application No. 11185675.3 issued by the European Patent Office on Feb. 12, 2013, pp. 1-3.

Amendment in view of Result of Consultation in counterpart European Application No. 11185675.3 submitted to the European Patent Office on Feb. 15, 2013, pp. 1-9.

Sasaki, P.L. Francois, D.N. Payne, "Accuracy and resolution of preform index-profiling by the spatial-filtering method," ECOC'81, 6.4-1, Copenhagen, Denmark.

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

Donalagic, "Opportunities to Enhance Multimode Fiber Links by Application of Overfilled Launch," Journal of Lightwave Technology, vol. 23, No. 11, (Nov. 2005) pp. 3526-3540.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glasgow, Scotland, pp. 1-2.

Guan et al., "Multimode Fibers for Compensating Intermodal Dispersion of Graded-Index Multimode Fibers", Jul. 2004, Journal of Lightwave Technology, vol. 22, No. 7, pp. 1714-1719.

Gloge et al., "Multimode Theory of Graded-Core Fibers", Bell System Technical Journal, vol. 52, No. 9, Nov. 1, 1973, pp. 1563-1578.

Kaminow et al., "Profile synthesis in multicomponent glass optical fibers", Applied Optics, vol. 16, No. 1, Jan. 1, 1977, pp. 108-112.

Freund, et al., "High-Speed Transmission in Multimode Fibers", Journal of Lightwave Technology, vol. 28, No. 4, Feb. 15, 2010, pp. 1-18.

Pepeljugoski et al., "15.6-Gb/s Transmission Over 1 km of Next Generation Multimode Fiber", IEEE Photonics Technology Letters, vol. 14, No. 5, May 2002, pp. 1-3.

Irven et al., "Long Wavelength Performance of Optical Fibres Co-Doped with Fluorine", Electronic Letters 8th, vol. 17, No. 1, pp. 3-5, (Jan. 1981).

* cited by examiner

MULTIMODE OPTICAL FIBER INSENSITIVE TO BENDING LOSSES

CROSS-REFERENCE TO PRIORITY APPLICATIONS

This U.S. nonprovisional application claims the benefit of French application Ser. No. 10/58485, for a "Fibre Optique Multimode Insensible aux Pertes par Courbure" (filed Oct. 18, 2010, at the National Institute of Industrial Property (France)) and French application Ser. No. 11/56877 "Fibre Optique Multimode Insensible aux Pertes par Courbure" (filed Jul. 27, 2011, at the National Institute of Industrial Property (France)). Each priority application is hereby incorporated by reference in its entirety.

FIELD OF THE INVENTION

The present invention relates to the field of transmission by optical fiber and, more specifically, to a multimode optical fiber that is insensitive to bending losses.

BACKGROUND

An optical fiber (or fiber), i.e., a glass fiber typically surrounded by one or more coating layers, conventionally includes an optical fiber core, which transmits and/or amplifies an optical signal, and an optical cladding, which confines the optical signal within the core. Accordingly, the refractive index of the core $n_c$ is typically greater than the refractive index of the optical cladding $n_g$ (i.e., $n_c > n_g$).

For optical fibers, the refractive index profile is generally classified according to the graphical appearance of the function that associates the refractive index with the radius of the optical fiber. Conventionally, the distance r to the center of the optical fiber is shown on the x-axis, and the difference between the refractive index (at radius r) and the refractive index of the optical fiber's outer cladding (e.g., an outer optical cladding) is shown on the y-axis. The refractive index profile is referred to as a "step" profile, "trapezoidal" profile, "alpha" profile, or "triangular" profile for graphs having the respective shapes of a step, a trapezoid, an alpha-gradient, or a triangle. These curves are generally representative of the optical fiber's theoretical or set profile. Constraints in the manufacture of the optical fiber, however, may result in a slightly different actual profile.

Generally speaking, two main categories of optical fibers exist: multimode fibers and single-mode fibers. In a multimode optical fiber, for a given wavelength, several optical modes are propagated simultaneously along the optical fiber. In a single-mode optical fiber, the signal propagates in a fundamental LP01 mode that is guided in the fiber core, while the higher order modes (e.g., the LP11 mode) are strongly attenuated. The typical diameter of a single-mode or multimode glass fiber is 125 microns. The core of a multimode optical fiber typically has a diameter of between about 50 microns and 62.5 microns, whereas the core of a single-mode optical fiber typically has a diameter of between about 6 microns and 9 microns. Multimode systems are generally less expensive than single-mode systems, because multimode light sources, connectors, and maintenance can be obtained at a lower cost Multimode optical fibers are commonly used for short-distance applications requiring a broad bandwidth, such as local networks or LAN (local area network). Multimode optical fibers have been the subject of international standardization under the ITU-T G.651.1 recommendations, which, in particular, define criteria (e.g., bandwidth, numerical aperture, and core diameter) that relate to the requirements for optical fiber compatibility. The ITU-T G.651.1 standard (July 2007) is hereby incorporated by reference in its entirety. In addition, the OM3 standard has been adopted to meet the demands of high-bandwidth applications (i.e., a data rate higher than 1 GbE, such as 10 gigabits per second (Gb/s)) over long distances (i.e., distances up to about 300 meters). The OM3 standard is hereby incorporated by reference in its entirety. With the development of high-bandwidth applications, the average core diameter for multimode optical fibers has been reduced from 62.5 microns to 50 microns.

Typically, an optical fiber should have the broadest possible bandwidth to perform well in a high-bandwidth application. For a given wavelength, the bandwidth of an optical fiber may be characterized in several different ways. Typically, a distinction is made between the so-called "overfilled launch" condition (OFL) bandwidth and the so-called "effective modal bandwidth" condition (EMB). The acquisition of the OFL bandwidth assumes the use of a light source exhibiting uniform excitation over the entire radial surface of the optical fiber (e.g., using a laser diode or light emitting diode (LED)).

Recently developed light sources used in high-bandwidth applications, such as VCSELs (Vertical Cavity Surface Emitting Lasers), exhibit an inhomogeneous excitation over the radial surface of the optical fiber. For this kind of light source, the OFL bandwidth is a less suitable measurement, and so it is preferable to use the effective modal bandwidth (EMB). The calculated effective bandwidth (EMBc) estimates the minimum EMB of a multimode optical fiber independent of the kind of VCSEL used. The EMBc is obtained from a differential-mode-delay (DMD) measurement (e.g., as set forth in the FOTP-220 standard).

An exemplary method of measuring DMD and calculating the effective modal bandwidth can be found in the FOTP-220 standard, which is hereby incorporated by reference in its entirety. Further details on this technique are set forth in the following publications, each of which is hereby incorporated by reference: P. F. Kolesar and D. J. Mazzarese, "*Understanding Multimode Bandwidth and Differential Mode Delay Measurements and Their Applications,*" Proceedings of the 51st Int'l Wire and Cable Symposium, 2002, pp. 453-460; and Doug Coleman and Phillip Bell, "*Calculated EMB Enhances 10 GbE Performance Reliability for Laser-Optimized 50/125 µm Multimode Fiber,*" Corning Cable Systems Whitepaper (March 2005).

FIG. 1 shows a schematic diagram of a DMD measurement according to the criteria of the FOTP-220 standard as published in its TIA SCFO-6.6 version of Nov. 22, 2002. FIG. 1 schematically represents a part of an optical fiber (i.e., an optical core surrounded by an outer cladding). A DMD graph is obtained by successively injecting into the multimode optical fiber 20 a light pulse 21 having a given wavelength $\lambda_0$ with a radial offset between each successive pulse. The delay of each pulse is then measured after a given length of fiber L. Multiple identical light pulses 21 (i.e., light pulses having the same amplitude, wavelength, and frequency) are injected with different radial offsets 24 with respect to the center 22 of the multimode optical fiber's core. The injected light pulse is depicted in FIG. 1 as a black dot on the optical core of the optical fiber. In order to characterize an optical fiber with a 50-micron diameter, the FOTP-220 standard recommends that individual measurements be carried out at radial offset intervals of about two microns or less. From these measurements, it is possible to determine the modal dispersion (i.e., from DMD graph 23) and the calculated effective modal bandwidth (EMBc).

The TIA-492AAAC-A standard, which is hereby incorporated by reference in its entirety, specifies the performance requirements for 50-micron-diameter multimode optical fibers used over long distances in Ethernet high-bandwidth transmission network applications. The OM3 standard requires, at a wavelength of 850 nanometers, an EMB of at least 2,000 MHz·km. The OM3 standard assures error-free transmissions for a data rate of 10 Gb/s (10 GbE) up to a distance of 300 meters. The OM4 standard requires, at a wavelength of 850 nanometers, an EMB of at least 4,700 MHz·km to obtain error-free transmissions for a data rate of 10 Gb/s (10 GbE) up to a distance of 550 meters. The OM4 standard is hereby incorporated by reference in its entirety.

In a multimode optical fiber, the difference between the propagation times, or group delay times, of the several modes along the optical fiber determine the bandwidth of the optical fiber. In particular, for the same propagation medium (i.e., in a step-index multimode optical fiber), the different modes have different group delay times. This difference in group delay times results in a time lag between the pulses propagating along different radial offsets of the optical fiber.

For example, as shown in the graph 23 on the right side of FIG. 1, a time lag is observed between the individual pulses. This FIG. 1 graph depicts each individual pulse in accordance with its radial offset in microns (y-axis) and the time in nanoseconds (x-axis) the pulse took to pass along a given length of the optical fiber.

As depicted in FIG. 1, the location of the peaks along the x-axis varies, which indicates a time lag (i.e., a delay) between the individual pulses. This delay causes a broadening of the resulting light pulse. Broadening of the light pulse increases the risk of the pulse being superimposed onto a trailing pulse and reduces the bandwidth (i.e., data rate) supported by the optical fiber. The bandwidth, therefore, is directly linked to the group delay time of the optical modes propagating in the multimode core of the optical fiber. Thus, to guarantee a broad bandwidth, it is desirable for the group delay times of all the modes to be identical. Stated differently, the intermodal dispersion should be zero, or at least minimized, for a given wavelength.

To reduce intermodal dispersion, the multimode optical fibers used in telecommunications generally have a core with a refractive index that decreases progressively from the center of the optical fiber to its interface with a cladding (i.e., an "alpha" core profile). Such an optical fiber has been used for a number of years, and its characteristics have been described in "*Multimode Theory of Graded-Core Fibers*" by D. Gloge et al., Bell system Technical Journal 1973, pp. 1563-1578, and summarized in "*Comprehensive Theory of Dispersion in Graded-Index Optical Fibers*" by G. Yabre, Journal of Lightwave Technology, February 2000, Vol. 18, No. 2, pp. 166-177. Each of the above-referenced articles is hereby incorporated by reference in its entirety.

A graded-index profile (i.e., an alpha-index profile) can be described by a relationship between the refractive index value n and the distance r from the center of the optical fiber according to the following equation:

$$n = n_1 \sqrt{1 - 2\Delta\left(\frac{r}{a}\right)^\alpha}$$

wherein, $\alpha \geq 1$, and $\alpha$ is a non-dimensional parameter that is indicative of the shape of the index profile;

$n_1$ is the maximum refractive index of the optical fiber's core;

a is the radius of the optical fiber's core; and $$\Delta = \frac{(n_1^2 - n_0^2)}{2n_1^2}$$

where $n_0$ is the minimum refractive index of the multimode core, which may correspond to the refractive index of the outer cladding (most often made of silica).

A multimode optical fiber with a graded index (i.e., an alpha profile) therefore has a core profile with a rotational symmetry such that along any radial direction of the optical fiber the value of the refractive index decreases continuously from the center of the optical fiber's core to its periphery. When a multimode light signal propagates in such a graded-index core, the different optical modes experience differing propagation mediums (i.e., because of the varying refractive indices). This, in turn, affects the propagation speed of each optical mode differently. Thus, by adjusting the value of the parameter $\alpha$, it is possible to obtain a group delay time that is virtually equal for all of the modes. Stated differently, the refractive index profile can be modified to reduce or even eliminate intermodal dispersion.

In practice, however, a manufactured multimode optical fiber has a graded-index central core surrounded by an outer cladding of constant refractive index. The core-cladding interface interrupts the core's alpha-index profile. Consequently, the multimode optical fiber's core never corresponds to a theoretically perfect alpha profile (i.e., the alpha set profile).

The outer cladding accelerates the higher-order modes with respect to the lower-order modes. This phenomenon is known as the "cladding effect." In DMD measurements, the responses acquired for the highest radial positions (i.e., nearest the outer cladding) exhibit multiple pulses, which results in a temporal spreading of the response signal. Therefore, bandwidth is diminished by this cladding effect.

Multimode optical fibers are commonly used for short-distance applications requiring a high bandwidth, such as local area networks (LANs). In such applications, the optical fibers may be subjected to accidental or otherwise unintended bending, which can give rise to signal attenuation and modify the mode power distribution and the bandwidth of the optical fiber. It is therefore desirable to achieve multimode optical fibers that are unaffected by bends having a radius of curvature of less than 10 millimeters.

One proposed solution involves using a 10 GbE source and injection conditions (i.e., into the optical fiber) that enable transmission that is unaffected by bends. Using such a source and such injection conditions, however, may not always be possible.

U.S. Patent Application Publication No. 2008/0166094, International Publication No. WO 2008/085851, and U.S. Pat. No. 7,787,731, each of which is hereby incorporated by reference in its entirety, describe a multimode optical fiber in which a buried trench is added to the cladding of the optical fiber to reduce or eliminate bending losses. The bending to which the optical fiber is subjected does not generate any attenuation of the signal. However, the position and the depth of the trench must be selected carefully in order not to degrade the bandwidth.

The publication, "*Low Bending Sensitivity of Regular OM3/OM4 in 10 GbE Applications*" by D. Molin and P. Sillard, Proc. Optical Fiber Communication Conference, JThA55 (2010), which is hereby incorporated by reference in its entirety, defines the system margin M for a system including an optical fiber. The system margin M depends on the effective modal bandwidth and, for a given modal bandwidth, describes the loss of optical energy of the incident signal caused by (i) modal dispersion in the optical fiber or (ii) the time shifts of the higher order modes. This publication discloses an optical fiber in which the modal bandwidth is increased by bending the optical fiber, thus improving the system margin M. This publication, however, does not describe an optical fiber that is insensitive to bending.

European Patent No. 2,166,386 (and its counterpart U.S. Patent Publication No. 2010/0067858), each of which is hereby incorporated by reference in its entirety, describe a multimode optical fiber that is insensitive to bending and includes a buried trench. The optical fiber presents a bandwidth that does not vary with the bending to which it is subjected, because all modes are resistant to bending. The insensitivity to bending, however, is obtained for an optical fiber having a large trench volume. A large trench volume implies deleterious effects on the optical fiber. Large quantities of dopants are necessary to obtain a wide trench, which complicates fabrication of the optical fiber. Moreover, the trench interferes with the bandwidth and guides leakage modes, thereby reducing the quality of the transmitted signal. Those effects can be compensated only by an optical fiber profile that is highly complex.

U.S. Patent Application Publication No. 2009/0010596, which is hereby incorporated by reference in its entirety, describes a multimode optical fiber in which the higher order modes are filtered to achieve transmission that is insensitive to bending. Filtering the bending losses, however, may lead to a loss of quality of the transmitted optical signal.

Therefore, there is a need for a multimode optical fiber that enables transmission without bending-induced degradation of the optical signal and that is free of the disadvantages associated with a large-volume trench.

SUMMARY

In one aspect, the present invention provides a method of selecting from a plurality of multimode optical fibers one or more multimode optical fibers in which respective modal bandwidths depend on the bending to which the optical fibers are subjected. The method includes, for each multimode optical fiber, determining a first modal bandwidth value BW when the optical fiber is not bent (i.e., the optical fiber is not subjected to bending), and determining a second modal bandwidth value bBW when the optical fiber is bent (i.e., the optical fiber is subjected to bending). The method further includes selecting multimode optical fibers for which the second value bBW exceeds a bandwidth threshold A. The bandwidth threshold A (i) is a function of the multimode optical fiber's first modal bandwidth value BW and a bending-loss value BL and (ii) is greater than the multimode optical fiber's first modal bandwidth value BW.

In an exemplary embodiment, the first modal bandwidth value BW is determined by carrying out dispersion mode delay (DMD) measurements on the optical fiber when it is not bent and weighting the DMD measurements using coefficients corresponding to when the optical fiber is not bent. The second modal bandwidth value bBW is determined by weighting the DMD measurements with coefficients corresponding to when the optical fiber is bent.

In another exemplary embodiment, the bandwidth threshold A satisfies the following equation:

$$A = \frac{BW}{(1 - BL \times D)^{1/\alpha}},$$

where:
A is the bandwidth threshold;
BW is the first modal bandwidth value of the optical fiber when the optical fiber is straight (i.e., not bent);
BL is a predetermined bending loss value;
D is a value that is a function of the first modal bandwidth value BW of the optical fiber when the optical fiber is straight (i.e., not bent); and
α is a constant.

In yet another exemplary embodiment, the value D satisfies the following equation, in which F is a constant:

$$D = \frac{BW^\alpha}{F}.$$

In yet another exemplary embodiment, the constant F is equal to $2 \times 10^8$.

In yet another exemplary embodiment, the constant α is equal to 2.4.

In yet another exemplary embodiment, the method includes, before determining the first modal bandwidth value BW, preselecting multimode optical fibers for which the bending losses of the optical fiber when it is bent exceed a predetermined threshold.

In yet another exemplary embodiment, the multimode optical fiber is subjected to bending of at least one quarter turn (e.g., a half turn or a full turn) around a bend radius of 10 millimeters or less (i.e., when determining the second modal bandwidth value bBW).

In yet another exemplary embodiment, the multimode optical fiber is subjected to bending of two turns around a radius of 5 millimeters (i.e., when determining the second modal bandwidth value bBW).

In yet another exemplary embodiment, the bending losses at the wavelength of 850 nanometers (nm) are about 0.5 decibels (dB) or greater (e.g., about 0.8 dB or greater).

In yet another exemplary embodiment, the method includes, after the step of determining the first modal bandwidth value BW, selecting multimode optical fibers for which the first modal bandwidth value BW of the optical fiber is about 3150 MHz·km or less at the wavelength of 850 nanometers.

In yet another exemplary embodiment, the bandwidth threshold A is equal to 4000 MHz·km at the wavelength of 850 nanometers.

In yet another exemplary embodiment, the bandwidth threshold A is equal to 5000 MHz·km at the wavelength of 850 nanometers.

In yet another exemplary embodiment, the bandwidth threshold A is equal to 6000 MHz·km at the wavelength of 850 nanometers.

In yet another exemplary embodiment, the modal bandwidth is an effective modal bandwidth.

In yet another exemplary embodiment, the bending losses are bending losses under restricted injection conditions.

In yet another exemplary embodiment, the modal bandwidth is a bandwidth under saturated injection conditions.

In yet another exemplary embodiment, the bending losses are bending losses under saturated injection conditions.

In another aspect, the present invention embraces a multimode optical fiber having a central core, an optical cladding, and an outer cladding. The central core has an outer radius $r_1$. The optical cladding includes an inner cladding adjacent the central core and a trench (i.e., a buried trench or a depressed cladding) adjacent the inner cladding. The inner cladding has an outer radius $r_2$ such that the difference $r_2-r_1$ between the inner cladding's radius $r_2$ and the central core's radius $r_1$ is typically between about 0.8 micron and 5 microns. The trench has an outer radius $r_3$ and a volume V that is typically between about −30 microns and −2 microns. The trench's volume V is given by the following expression, in which $\Delta n_t$ is the refractive index difference of the trench with respect to the outer cladding as a function of the radius r, where r corresponds to the radial distance with respect to the center of the optical fiber:

$$V = \int_{r2}^{r3} \Delta n_t \times 1000 \times dr.$$

Typically, the multimode optical fiber's modal bandwidth depends on the bending to which the optical fiber is subjected. The multimode optical fiber has a first modal bandwidth value BW when the optical fiber is straight (i.e., not bent). The multimode optical fiber also has a second modal bandwidth value bBW when the optical fiber is bent. Typically, the optical fiber's second modal bandwidth value bBW exceeds a bandwidth threshold A. The bandwidth threshold A, which is greater than the first modal bandwidth value BW, is a function of (i) the first modal bandwidth value BW and (ii) a predetermined bending loss value BL.

In an exemplary embodiment, the bandwidth threshold A satisfies the following equation:

$$A = \frac{BW}{(1 - BL \times D)^{1/\alpha}},$$

where:
A is the bandwidth threshold;
BW is the first modal bandwidth value BW when the optical fiber is straight (i.e., not bent);
BL is a predetermined bending loss value;
D is a value that is a function of the first modal bandwidth value BW when the optical fiber is straight (i.e., not bent); and
$\alpha$ is a constant.

In another exemplary embodiment, the value D satisfies the following equation, in which F is a constant:

$$D = \frac{BW^\alpha}{F}.$$

In yet another exemplary embodiment, the constant F is equal to $2 \times 10^8$.

In yet another exemplary embodiment, the constant $\alpha$ is equal to 2.4.

In yet another exemplary embodiment, the volume V of the trench is between about −20 microns and −10 microns.

In yet another exemplary embodiment, the difference $r_2-r_1$ between the inner cladding's radius $r_2$ and the central core's radius $r_1$ (i.e., the width of the inner cladding) is between about 0.8 micron and 2 microns (e.g., 1.0 micron to 1.5 microns).

In yet another exemplary embodiment, for a wavelength of 850 nanometers with two turns around a bend radius of 5 millimeters (mm), the bending losses of the optical fiber are about 0.5 dB or greater (e.g., about 0.8 dB or greater).

In yet another exemplary embodiment, the first modal bandwidth value BW when the optical fiber is straight (i.e., not bent) is less than 3150 MHz·km at a wavelength of 850 nanometers.

In yet another exemplary embodiment, at a wavelength of 850 nanometers with two turns of optical fiber with a bend radius of 5 millimeters, the modal bandwidth value bBW is greater than 4000 MHz·km (e.g., greater than 5000 MHz·km).

In yet another exemplary embodiment, at a wavelength of 850 nanometers with two turns of optical fiber with a bend radius of 5 millimeters, the modal bandwidth value bBW is greater than 6000 MHz·km.

In yet another exemplary embodiment, the modal bandwidth is an effective modal bandwidth.

In yet another exemplary embodiment, the bending losses are bending losses under restricted injection conditions.

In yet another exemplary embodiment, the modal bandwidth is a bandwidth under saturated injection conditions.

In yet another exemplary embodiment, the bending losses are bending losses under saturated injection conditions.

In yet another aspect, the present invention embraces the use of a selected multimode optical fiber as a transmission medium in an optical fiber to the home (FTTH) system.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a method of selecting a multimode optical fiber. In the multimode optical fiber obtained in accordance with a method of the present invention, the modal bandwidth value when the optical fiber is bent is greater than a threshold that is a function of both (i) the value of the modal bandwidth when the optical fiber is not bent and of (ii) a predetermined bending loss value. The modal bandwidth values may be, for example, an effective bandwidth or a bandwidth under saturated injection conditions.

Thus, the modal bandwidth of the multimode optical fiber when it is bent is sufficiently high to compensate the optical fiber's bending losses.

If the optical fiber is bent, the corresponding bending losses imply a reduction of power. The bending losses, however, are compensated by an increase in the modal bandwidth. Thus, the quality of the signal transmitted by the optical fiber is generally insensitive to bending losses, and the signal-to-noise ratio is generally constant or even improved.

The quality of the signal transmitted by an optical system including a multimode optical fiber may be defined by the optical system's system margin M as a function of the modal bandwidth. In particular, system margin M as a function of the bandwidth of an optical link having a bit rate of 10 Gb/s over 300 meters and including a multimode optical fiber may be defined by the following equation, in which BP is the modal bandwidth of the multimode optical fiber:

$$M = 3.1 - \frac{2 \times 10^8}{BP^{2.4}}.$$

The expression for the system margin M (above) may be obtained from the 10 Gb/s Link Budget Spreadsheet developed by the IEEE P802.3ae 10 Gb/s Ethernet Task Force. The 10 Gb/s Link Budget Spreadsheet version 3.1.16a (Nov. 1, 2001) and its prior versions are hereby incorporated by reference in their entireties.

Figure 1:
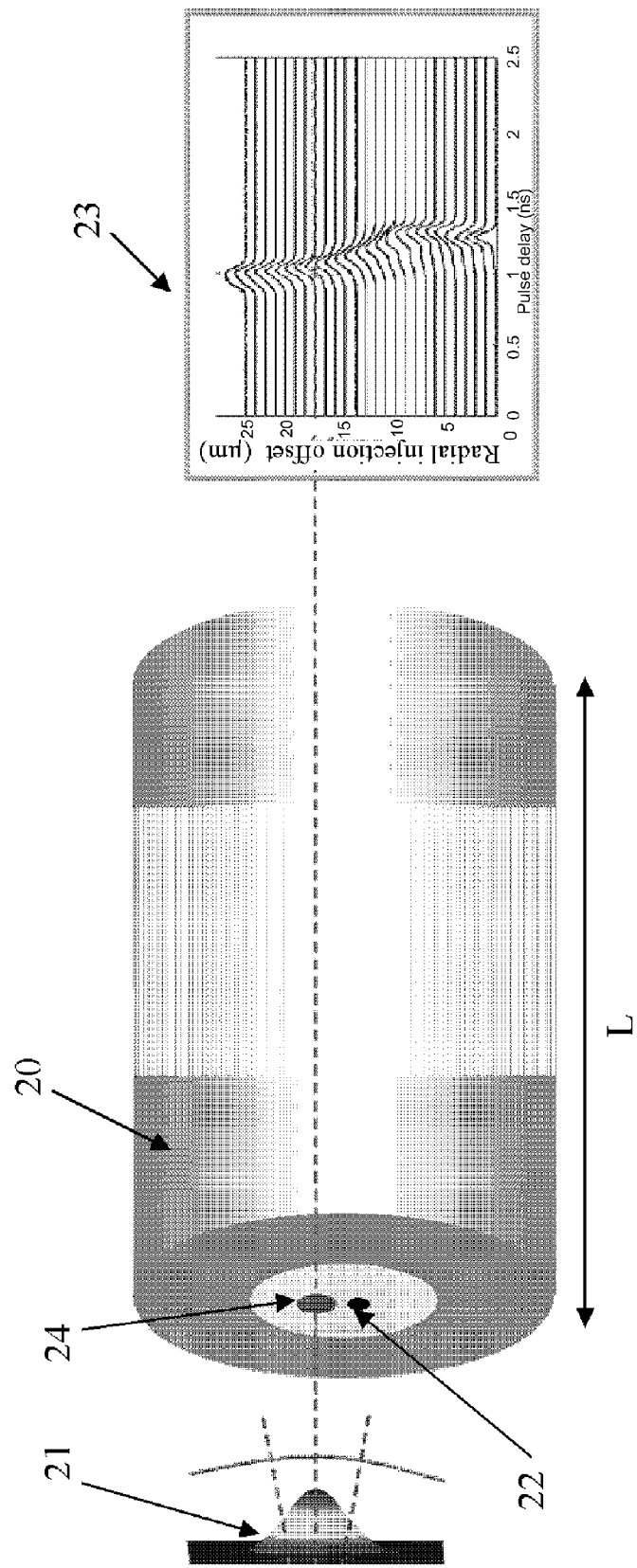
FIG. 1 schematically depicts an exemplary DMD measurement method and graph.
Figure 2:
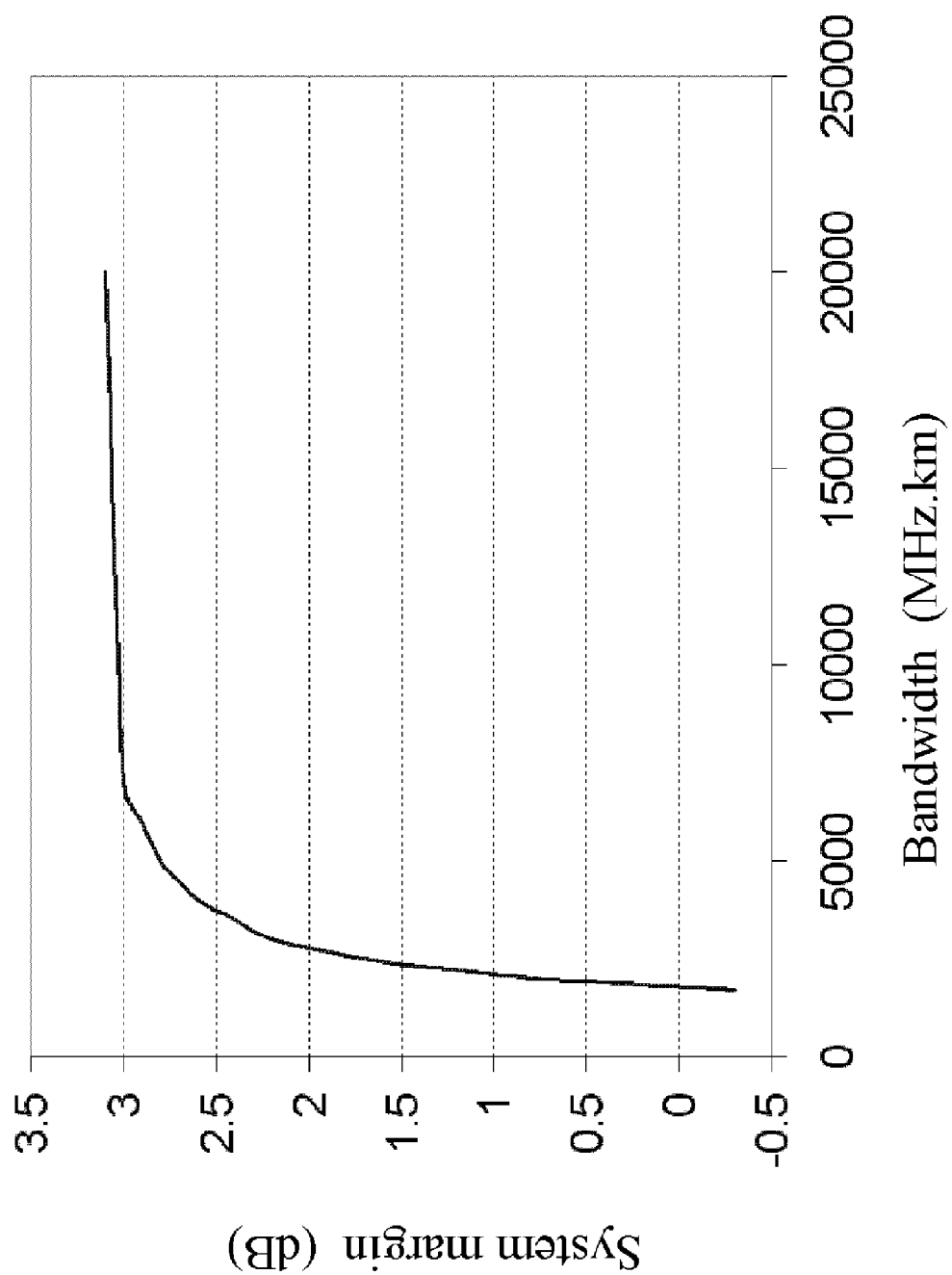
FIG. 2 graphically depicts system margin as a function of bandwidth for a system that includes a multimode optical fiber.

FIG. 2 shows the system margin M of a link having a bit rate of 10 GbE over 300 meters as a function of the modal bandwidth. The system margin M is expressed in decibels (dB). The modal bandwidth is expressed in MHz·km. The higher the system margin M, the better the quality of the transmitted signal. In other words, the higher the margin, the lower the attenuation of the signal associated with the bandwidth.

It is seen in FIG. 2 that the system margin increases with the modal bandwidth up to a plateau: for a bandwidth value in the range 0 MHz·km to approximately 6000 MHz·km, the system margin increases up to a value of approximately 3 dB; for bandwidths exceeding approximately 6000 MHz·km, the system margin is substantially stable at a value of 3.1 dB. Increasing the bandwidth can thus improve the signal transmitted in the optical fiber.

Moreover, the modal bandwidth of a multimode optical fiber may be a function of the bending of the optical fiber. The bandwidth may be limited by time shifts of the higher order modes. If the optical fiber is bent, the time shifts are unchanged. The higher order modes are attenuated, however, leading to an increased bandwidth. This is illustrated by FIGS. 3-6, whose respective curves were acquired at a wavelength of 850 nanometers.

Figure 3:
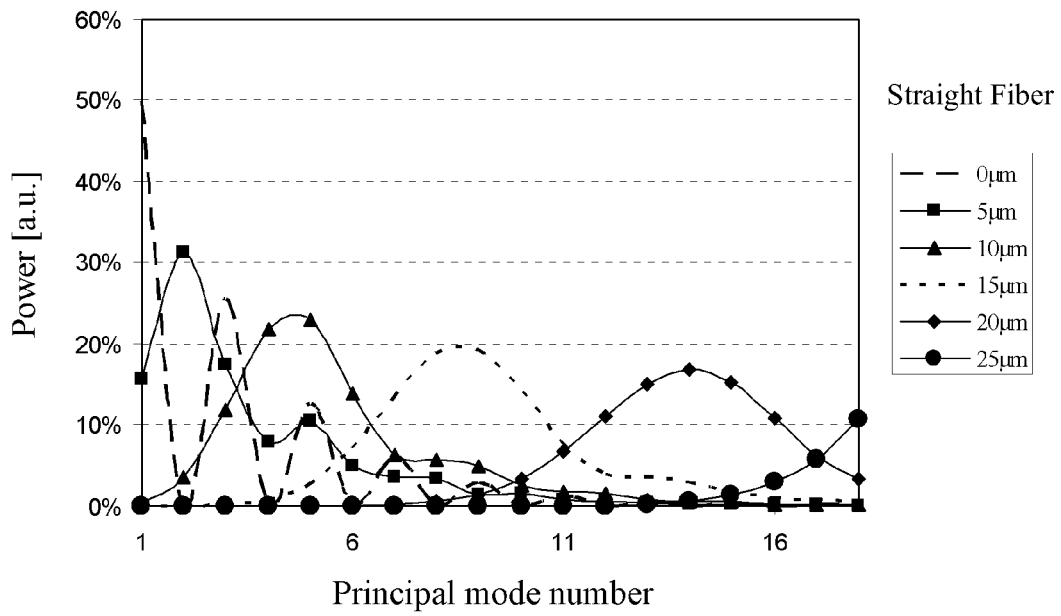
FIG. 3 shows, for an unbent multimode optical fiber, power distributions of signals emitted by the same source and transmitted via the multimode optical fiber with different injection radial offsets as a function of the optical fiber's propagation modes.

FIG. 3 represents the power distributions in the various mode groups for different injection radial offsets produced during DMD measurements, referred to below as DMD power distributions. The power is expressed in arbitrary units (a.u.). The FIG. 3 curves were acquired with the optical fiber straight and not bent. Each curve was obtained for a signal emitted by the same source with a different injection radial offset. In a multimode optical fiber, the propagation modes of the transmitted signal are organized in mode groups. Each mode group is designated by a principal mode number or order. FIG. 3 shows, on the abscissa axis (i.e., the x-axis), the principal mode number of the propagation modes inherent to the optical fiber. For radial offsets of 15 microns to 25 microns, the higher order modes constitute the greater part of the transmitted signal. These higher order modes may have different propagation speeds, and, if so, the DMD measurements obtained for the radial offsets of 15 microns to 25 microns therefore represent a spread signal. In other words, the time shifts of the optical fiber's higher order modes may be non-negligible and may reduce the modal bandwidth of the optical fiber.

Figure 4:
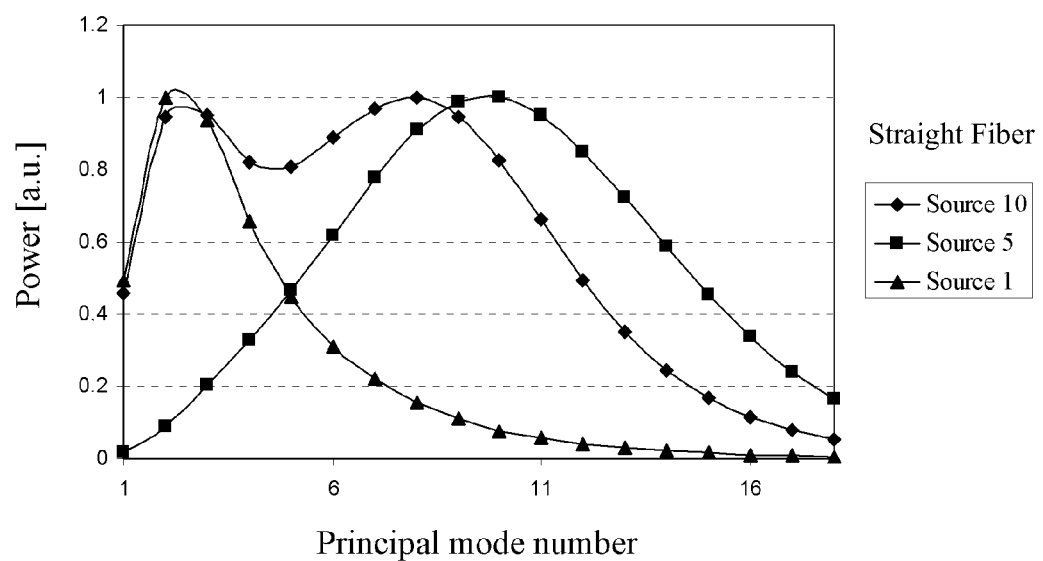
FIG. 4 shows, for an unbent multimode optical fiber, power distributions of signals emitted by different examples of sources and transmitted via the multimode optical fiber as a function of the propagation modes.

The modal power distribution corresponding to a particular source is obtained from the DMD power distribution. FIG. 4 shows modal power distributions for different examples of sources (source 1, source 5, and source 10).

These modal power distributions are obtained from a weighted sum of the FIG. 3 curves. Source 1 concentrates the transmitted signal in the lower order modes. With source 5, in contrast, a major part of the signal is in the higher order modes. The sources are not equivalent insofar as the power modal distribution is concerned. Source 5 is more sensitive to the time shifts of the higher order modes, which may limit the modal bandwidth corresponding to source 5.

Figure 5:
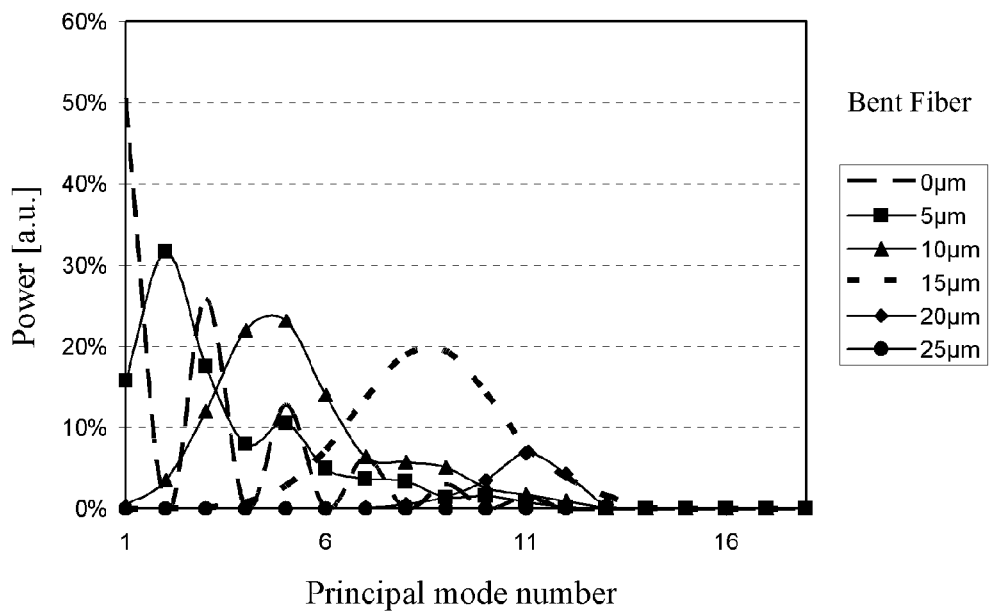
FIG. 5 shows, for a bent multimode optical fiber, power distributions of signals emitted by the same source and transmitted via the multimode optical fiber with different injection radial offsets as a function of the optical fiber's propagation modes.

FIG. 5 shows DMD power distributions of signals transmitted via the multimode optical fiber when it is bent (i.e., in a state where it is subjected to bending). In the example shown in FIG. 5, the optical fiber is subjected to two turns around a bend radius of 5 millimeters. The signals are emitted by the same source with different radial offsets. The higher order modes are strongly attenuated. This is reflected in the virtual absence of signal for the higher injection radial offsets. For a radial offsets of 20 microns to 25 microns, for example, the signal transmitted is very weak. In a bent multimode optical fiber, the higher order modes may therefore be filtered. Thus, the modal bandwidth is not influenced by the time shifts of the higher order modes.

Figure 6:
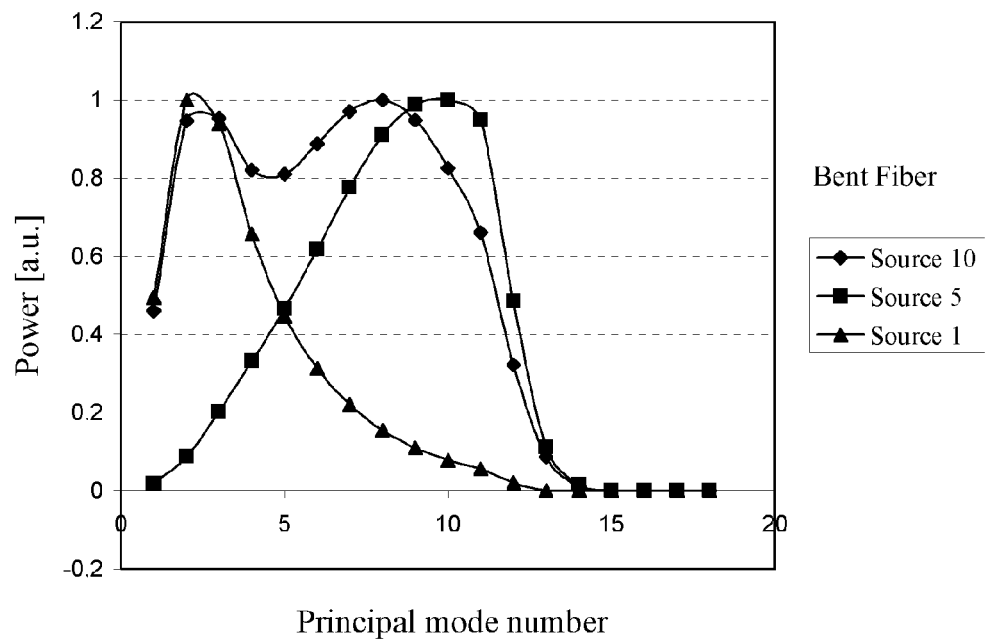
FIG. 6 shows, for a bent multimode optical fiber, power distributions of signals emitted by the same examples of sources as in FIG. 4 and transmitted via the multimode optical fiber as a function of the propagation modes.

FIG. 6 shows modal power distributions for the same examples of sources as FIG. 4 when the multimode optical fiber is subjected to two turns around a bend radius of 5 millimeters. FIG. 6 shows that for whatever the source used the signal transmitted is concentrated in the lower order modes. Bending the optical fiber filters modes of order higher than 15. With the higher order modes being filtered, the proportion of higher order modes in the time response of the optical fiber is greatly diminished. If it is only these higher order modes that limit the bandwidth of the optical fiber (i.e., if all the other modes have substantially equal group delay times), then the modal bandwidth is increased whichever source is used.

Thus, the bandwidth may be increased as a function of the bending to which the optical fiber is subjected. The system margin M may thus be improved as a function of the bending to which the optical fiber is subjected.

Accordingly, if an optical fiber is bent, the modal bandwidth may be increased sufficiently to compensate bending losses, at least in part.

In other words, if the optical fiber is bent sharply, its modal bandwidth changes, leading to an increase in the system margin M of the system that includes the optical fiber. This increase in the system margin M is limited by a plateau, such as depicted in FIG. 2. The maximum increase of the system margin M corresponds to a budget for bending losses that may be compensated. This budget is compared with the bending losses actually induced.

If the bending losses actually induced are greater than this budget, then the bending losses are only partially compensated. The signal-to-noise ratio is thus degraded.

If the bending losses actually induced are equal to the budget, then the bending losses are compensated. The signal-to-noise ratio is not degraded, remaining substantially constant.

If the bending losses actually induced are less than the budget, they are overcompensated. The performance of the system is even improved. The signal-to-noise ratio is thus improved.

Figure 10:
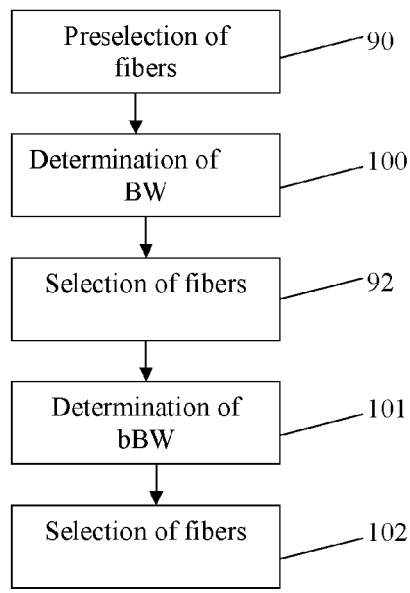
FIG. 10 shows the steps for an exemplary method according to the present invention.

The method of the present invention makes it possible to select multimode optical fibers that make possible a constant or improved signal-to-noise ratio. FIG. 10 shows the main steps of an exemplary method for selecting one or more multimode optical fibers from a plurality of multimode optical fibers.

The depicted method includes a step 100 of determining a first modal bandwidth value BW for each optical fiber when the optical fiber is not bent (i.e., a straight modal bandwidth value BW). The optical fiber is not bent if it is kept straight. For example, the optical fiber is straight when it has a bend radius greater than 100 millimeters with a tension of less than 50 grams-force (gf) applied to the optical fiber.

The method further includes a step 101 of determining a second modal bandwidth value bBW for each multimode optical fiber when the optical fiber is bent (i.e., a bent modal bandwidth value bBW). In one example, the bend is at least one quarter turn (e.g., a half turn or a full turn) around a bend radius of 10 millimeters or less (e.g., 7.5 millimeters or 5 millimeters). In another example, the bends are two turns around a radius of 5 millimeters. In yet another example, the bends are two turns around a radius of 7.5 millimeters. In yet another example, the bends are five turns around a radius of 5 millimeters. In yet another example, the bends are five turns around a radius of 7.5 millimeters.

The method further includes a step 102 of selecting multimode optical fibers for which the second value bBW is greater than a bandwidth threshold A. The threshold A is greater than the first modal bandwidth value BW. The threshold A depends on a predetermined bending loss value BL. The value BL, which is greater than zero, corresponds to maximum bending losses permitted when the optical fiber is bent. The permitted maximum bending losses BL are given, for example, by the specifications of the optical system in which the optical fiber is to be used. In other words, in the optical system in which the optical fiber is to be used, the optical fiber has bending losses less than or equal to the value BL. The threshold A also depends on the optical fiber's first modal bandwidth value BW when it is not bent (i.e., when the optical fiber is held straight).

The exemplary method makes it possible to identify optical fibers in which, when the optical fibers are bent, the corresponding bending losses are compensated, or even overcompensated, by an increase in the modal bandwidth. Bending loss compensation is possible if the optical fiber's modal bandwidth bBW when it is bent exceeds a bandwidth threshold A.

Thus, the method makes it possible to select from a plurality of multimode optical fibers those for which, if the optical fiber is bent, the modal bandwidth is sufficiently increased to compensate bending losses.

In optical fibers obtained by the exemplary method, the quality of the signal (i.e., the signal-to-noise ratio of signals transmitted via the optical fiber) is generally insensitive to bending.

In an exemplary embodiment of the method, the threshold A satisfies the following equation:

$$A = \frac{BW}{(1 - BL \times D)^{\frac{1}{\alpha}}},$$

where:

A is the bandwidth threshold;

BW is the first modal bandwidth value of the optical fiber when the optical fiber is not bent;

BL is the predetermined bending loss value;

D is a value that is a function of the first modal bandwidth value BW of the optical fiber when the optical fiber is not bent; and α is a constant.

In an exemplary embodiment, the value D satisfies the following equation, in which F is a constant:

$$D = \frac{BW^{\alpha}}{F}.$$

The threshold A may be obtained from the 10 Gb/s Link Budget Spreadsheet developed by the IEEE P802.3ae 10 Gb/s Ethernet Task Force and the definition of the system margin. This particular method of obtaining the threshold A is provided by way of non-limiting example.

Taking into account the maximum bending losses BL permitted for the optical fiber, an optical fiber system is considered insensitive to bending if the system margin when the optical fiber is bent is greater than the system margin when the optical fiber is not bent.

Thus, in this exemplary embodiment of the invention, the optical fiber satisfies the following condition:

$$3.1 - \frac{2 \times 10^8}{bBW^{2.4}} - BL > 3.1 - \frac{2 \times 10^8}{BW^{2.4}}.$$

Thus, an optical fiber selected from the plurality of multimode optical fibers enables transmission that is insensitive to bending provided the second modal bandwidth value bBW exceeds the threshold A when $F=2\times10^8$ and $\alpha=2.4$.

In other words, in this embodiment of the invention, the step 102 of selecting one or more optical fibers from the plurality of multimode optical fibers includes determining whether the second modal bandwidth value bBW satisfies the following condition:

$$bBW > \frac{BW}{\left(1 - BL \times \frac{BW^{2.4}}{2 \times 10^8}\right)^{\frac{1}{2.4}}}.$$

In one exemplary embodiment, the modal bandwidth is an effective modal bandwidth (EMB). The bending losses are bending losses under restricted injection conditions. Acquiring the modal bandwidth and bending losses under restricted injection conditions is particularly suitable when the optical fiber is used in an optical system in which a light source provides non-uniform excitation over the radial surface of the optical fiber. One example of such a source is a vertical-cavity surface-emitting laser (VCSEL). The injection conditions are for example those defined by the G.651.1 standard.

In another exemplary embodiment, the modal bandwidth is an OFL bandwidth under saturated injection conditions. The bending losses are the bending losses under saturated injection conditions. Acquiring the modal bandwidth and the bending losses under saturated injection conditions is particularly suitable when the optical fiber is used in an optical system in which a light source provides uniform excitation over the whole of the radial surface of the optical fiber. One example of such a light source is a laser diode or LED (light-emitting diode).

In another exemplary embodiment, the step 100 of determining the first modal bandwidth value BW includes performing dispersion mode delay (DMD) measurements on the optical fiber when it is not bent. To obtain the first modal bandwidth value BW, the DMD measurements are weighted with coefficients C corresponding to when the optical fiber is not bent.

In another exemplary embodiment, the step 101 of determining the second modal bandwidth value bBW includes weighting the DMD measurements with coefficients Cb corresponding to when the optical fiber is bent. Thus, the second modal bandwidth value bBW is determined without bending the optical fiber. This simplifies the selection method.

This exemplary embodiment of the invention may be better understood by considering an example of a multimode optical fiber to be coupled with a 10G-BASE-S source. 10G-BASE-S sources generally feature restricted injection (i.e., not all propagation modes of the optical fiber are excited uniformly). The effective modal bandwidth EMB generally depends on the 10G-BASE-S source to which the optical fiber is coupled. Here, the calculated effective modal bandwidth EMBc may refer to the minimum effective modal bandwidth of the optical fiber regardless of the source used.

Thus, in this exemplary embodiment, the modal bandwidth is the calculated effective modal bandwidth. The step 102 of selecting one or more optical fibers from the plurality of multimode optical fibers includes selecting optical fibers for which the first value EMBc and the second value bEMBc of the calculated effective modal bandwidth satisfy the following condition:

$$bEMBc > \frac{EMBc}{\left(1 - BL \times \frac{EMBc^{2.4}}{2 \times 10^8}\right)^{\frac{1}{2.4}}}.$$

The first value EMBc of the calculated effective modal bandwidth is obtained from the DMD measurements. Each predefined source has its set of coefficients C, each coefficient C corresponding to an injection radial offset. These coefficients C have been standardized. The responses of the optical fiber to ten (10) predefined sources are determined by weighting the DMD measurements by the coefficient C corresponding to each source and adding the weighted DMD measurements from the same source.

Table 1 (below) provides exemplary values of the coefficients C for each of the ten predefined sources (referred to as sources 1 to 10) and for each injection radial offset from 0 to 24 microns in one-micron steps.

TABLE 1

| Injection radial offset [μm] | Source 1 | Source 2 | Source 3 | Source 4 | Source 5 | Source 6 | Source 7 | Source 8 | Source 9 | Source 10 |
|---|---|---|---|---|---|---|---|---|---|---|
| 0 | 0 | 0 | 0 | 0 | 0 | 0 | 0 | 0 | 0 | 0 |
| 1 | 0.033023 | 0.023504 | 0 | 0 | 0 | 0.015199 | 0.016253 | 0.022057 | 0.01043 | 0.015681 |
| 2 | 0.262463 | 0.188044 | 0 | 0 | 0 | 0.12091 | 0.129011 | 0.17639 | 0.083496 | 0.124978 |
| 3 | 0.884923 | 0.634634 | 0 | 0 | 0 | 0.407702 | 0.434844 | 0.595248 | 0.281802 | 0.421548 |
| 4 | 2.009102 | 1.447235 | 0.007414 | 0.005637 | 0.003034 | 0.925664 | 0.987184 | 1.351845 | 0.65028 | 0.957203 |
| 5 | 3.231216 | 2.376616 | 0.072928 | 0.055488 | 0.029856 | 1.488762 | 1.5876 | 2.174399 | 1.130599 | 1.539535 |
| 6 | 3.961956 | 3.052908 | 0.262906 | 0.20005 | 0.107634 | 1.825448 | 1.946614 | 2.666278 | 1.627046 | 1.887747 |
| 7 | 3.694686 | 3.150634 | 0.637117 | 0.483667 | 0.258329 | 1.702306 | 1.815285 | 2.486564 | 2.044326 | 1.762955 |
| 8 | 2.644369 | 2.732324 | 1.197628 | 0.89695 | 0.458494 | 1.218378 | 1.299241 | 1.780897 | 2.29172 | 1.292184 |
| 9 | 1.397552 | 2.060241 | 1.916841 | 1.402833 | 0.661247 | 0.643911 | 0.686635 | 0.945412 | 2.280813 | 0.790844 |
| 10 | 0.511827 | 1.388339 | 2.755231 | 1.957805 | 0.826035 | 0.238557 | 0.25585 | 0.360494 | 1.937545 | 0.55938 |
| 11 | 0.110549 | 0.834722 | 3.514797 | 2.433247 | 1.000204 | 0.098956 | 0.131429 | 0.163923 | 1.383006 | 0.673655 |
| 12 | 0.004097 | 0.419715 | 3.883317 | 2.639299 | 1.294439 | 0.204274 | 0.327091 | 0.318712 | 0.878798 | 1.047689 |
| 13 | 0.000048 | 0.160282 | 3.561955 | 2.397238 | 1.813982 | 0.529982 | 0.848323 | 0.778983 | 0.679756 | 1.589037 |
| 14 | 0.001111 | 0.047143 | 2.617093 | 1.816953 | 2.50695 | 1.024948 | 1.567513 | 1.383174 | 0.81236 | 2.138626 |
| 15 | 0.005094 | 0.044691 | 1.480325 | 1.296977 | 3.164213 | 1.611695 | 2.224027 | 1.853992 | 1.074702 | 2.470827 |
| 16 | 0.013918 | 0.116152 | 0.593724 | 1.240553 | 3.572113 | 2.210689 | 2.55506 | 1.914123 | 1.257323 | 2.361764 |
| 17 | 0.02632 | 0.219802 | 0.153006 | 1.70002 | 3.618037 | 2.707415 | 2.464566 | 1.511827 | 1.255967 | 1.798213 |
| 18 | 0.036799 | 0.307088 | 0.012051 | 2.240664 | 3.329662 | 2.9388 | 2.087879 | 0.90833 | 1.112456 | 1.059264 |
| 19 | 0.039465 | 0.329314 | 0 | 2.394077 | 2.745395 | 2.73932 | 1.577111 | 0.386991 | 0.879309 | 0.444481 |
| 20 | 0.032152 | 0.268541 | 0 | 1.952429 | 1.953241 | 2.090874 | 1.056343 | 0.11176 | 0.608183 | 0.123304 |
| 21 | 0.019992 | 0.16697 | 0 | 1.213833 | 1.137762 | 1.261564 | 0.595102 | 0.014829 | 0.348921 | 0.012552 |
| 22 | 0.008832 | 0.073514 | 0 | 0.534474 | 0.494404 | 0.55214 | 0.256718 | 0.001818 | 0.15112 | 0 |
| 23 | 0.002612 | 0.021793 | 0 | 0.158314 | 0.146517 | 0.163627 | 0.076096 | 0.00054 | 0.044757 | 0 |
| 24 | 0.000282 | 0.002679 | 0 | 0.019738 | 0.018328 | 0.020443 | 0.009446 | 0 | 0.005639 | 0 |

The first effective modal bandwidth value EMBc corresponding to each source is calculated from the weighted DMD measurements in a known manner. The first calculated effective modal bandwidth value EMBc is defined here as the minimum value of all the effective modal bandwidths of the sources multiplied by 1.13.

The second value bEMBc of the calculated effective modal bandwidth may be determined by weighting the DMD measurements with coefficients Cb corresponding to the optical fiber when it is bent. Thus, in exemplary methods, the calculated effective modal bandwidth bEMBc of the bent optical fiber may be obtained without carrying out DMD measurements on the optical fiber when it is bent. This facilitates optical fiber selection.

Table 2 (below) provides exemplary values of the coefficients Cb for each of the ten predefined sources (source 1 to source 10) and for each injection radial offset from 0 to 24 microns in one-micron steps.

for which the bending losses of the optical fiber when it is bent exceed a given threshold. This step 90 makes it possible to preselect optical fibers in which the bending losses are sufficiently high to filter the higher order modes, enabling significant variation in the modal bandwidth.

For example, the step 90 preselects optical fibers with bending losses greater than 0.5 dB (e.g., greater than 0.8 dB) for two turns around a bend radius of 5 millimeters at a signal wavelength of 850 nanometers.

In another exemplary embodiment, the step 90 preselects optical fibers with bending losses greater than 0.2 dB, or even greater than 0.3 dB (e.g., greater than 0.5 dB), for two turns around a bend radius of 7.5 millimeters at a signal wavelength of 850 nanometers.

In another exemplary embodiment, the step 90 preselects optical fibers with bending losses greater than 1 dB for two turns around a bend radius of 7.5 millimeters at a signal wavelength of 850 nanometers.

TABLE 2

| Injection radial offset [μm] | Source 1 | Source 2 | Source 3 | Source 4 | Source 5 | Source 6 | Source 7 | Source 8 | Source 9 | Source 10 |
|---|---|---|---|---|---|---|---|---|---|---|
| 0  | 0        | 0.028138 | 0.002551 | 0        | 0.001293 | 0        | 0.027502 | 0.033485 | 0.02446  | 0        |
| 1  | 0.033023 | 0        | 0        | 0        | 0.000621 | 0        | 0.000238 | 0        | 0.001471 | 0        |
| 2  | 0.262463 | 0.154503 | 0        | 0        | 0.000903 | 0.182093 | 0.000248 | 0        | 0        | 0.085648 |
| 3  | 0.884923 | 0.684933 | 0.010429 | 0.002323 | 0.001388 | 0.284241 | 0.48179  | 0.828853 | 0.317819 | 0.557466 |
| 4  | 2.009102 | 1.443966 | 0.0215   | 0.000272 | 0        | 0.78756  | 0.640655 | 0.892097 | 0.442104 | 0.440988 |
| 5  | 3.231216 | 2.356534 | 0.030367 | 0.005174 | 0.001406 | 1.520111 | 1.126889 | 1.475559 | 0.850026 | 1.353632 |
| 6  | 3.961956 | 3.112897 | 0.104842 | 0.429298 | 0.183667 | 1.54768  | 1.662869 | 2.956761 | 1.603881 | 2.036097 |
| 7  | 3.694686 | 3.140573 | 0.887269 | 0.047724 | 0        | 1.357957 | 1.261186 | 1.514233 | 1.362334 | 0.913113 |
| 8  | 2.644369 | 2.724777 | 0.231595 | 0.584602 | 0.276017 | 1.443303 | 1.105849 | 1.298356 | 1.683349 | 0.886987 |
| 9  | 1.397552 | 2.150405 | 2.257429 | 2.136491 | 1.072384 | 0.400341 | 0.452409 | 1.327938 | 2.446713 | 1.500928 |
| 10 | 0.511827 | 1.319808 | 2.106762 | 0.878218 | 0        | 0        | 0        | 0        | 1.123154 | 0        |
| 11 | 0.110549 | 0.790618 | 1.422348 | 0.946533 | 0        | 0        | 0        | 0        | 0.503126 | 0        |
| 12 | 0.004097 | 0.589647 | 5.044105 | 4.592444 | 2.760172 | 1.177714 | 1.024579 | 0.157154 | 2.082409 | 1.463809 |
| 13 | 0.000048 | 0        | 1.476601 | 1.422809 | 1.378172 | 0        | 0.779882 | 1.767951 | 0.071793 | 2.278489 |
| 14 | 0.001111 | 0        | 2.11325  | 0        | 0        | 0        | 0        | 0        | 0        | 0        |
| 15 | 0.005094 | 0        | 1.688557 | 0        | 0        | 0        | 0        | 0.458354 | 0        | 1.672927 |
| 16 | 0.013918 | 0.676772 | 0.030671 | 5.190242 | 8.991056 | 6.374081 | 6.532025 | 4.364617 | 3.866468 | 4.815874 |
| 17 | 0.02632  | 0        | 0        | 1.162318 | 1.196531 | 3.021792 | 0.541182 | 0        | 0        | 0        |
| 18 | 0.036799 | 0        | 0        | 0        | 0        | 0        | 0        | 0        | 0        | 0        |
| 19 | 0.039465 | 0        | 0        | 0        | 0        | 0        | 0        | 0        | 0        | 0        |
| 20 | 0.032152 | 0        | 0        | 0        | 0        | 0        | 0        | 0        | 0        | 0        |
| 21 | 0.019992 | 0        | 0        | 0        | 0        | 0        | 0        | 0        | 0        | 0        |
| 22 | 0.008832 | 0        | 0        | 0        | 0        | 0        | 0        | 0        | 0        | 0        |
| 23 | 0.002612 | 0        | 0        | 0        | 0        | 0        | 0        | 0        | 0        | 0        |
| 24 | 0.000282 | 0        | 0        | 0        | 0        | 0        | 0        | 0        | 0        | 0        |

The coefficients Cb may be obtained from DMD measurements carried out on the optical fiber when it is not bent. When the optical fiber is bent, the higher order modes are filtered. The effect of the bending losses on the DMD measurements may be modeled. In particular, it is possible to model the DMD power distributions that would be obtained for each injection radial offset if the optical fiber were bent on the basis of the DMD measurements acquired from the optical fiber when it is not bent. It is possible to modify the coefficients C to obtain the coefficients Cb corresponding to the bent optical fiber from the power distributions for each source when the multimode optical fiber is bent. Exemplary bends might be two turns around a bend radius of 5 millimeters.

In an exemplary embodiment, the coefficients Cb depend on the optical fiber's refractive index profile. This applies in particular when the optical cladding of the optical fiber includes a trench to improve its bending resistance.

In another exemplary embodiment, the method further includes—before the step 100 of determining the first modal bandwidth value BW—a step 90 of preselecting optical fibers In an exemplary embodiment, the method includes—after the step 100 of determining the first modal bandwidth value BW—a step 92 of selecting optical fibers for which the optical fiber's first modal bandwidth value BW (i.e., the value when the optical fiber is straight) is less than 3150 MHz·km at a wavelength of 850 nanometers. This step 92 makes it possible to select optical fibers that are suitable for use in a system conforming to the OM3 and OM4 standards.

A multimode optical fiber usable under the OM3 and OM4 standards (the specifications of these standards include a core diameter of 50 microns and a numerical aperture (NA) equal to 0.200+/−0.015) is typically coupled to a 10G-BASE-S source (which conforms to the 10 GbE standard) operating in an optical system in the range of 840-860 nanometers.

The bending losses may then reach approximately 1.5 dB for five turns around a bend radius of 5 millimeters. For five turns around a bend radius of 7.5 millimeters, the bending losses may reach 0.8 dB. For two turns around a bend radius of 5 millimeters, the bending losses may reach approximately 1.2 dB. For two turns around a bend radius of 7.5 millimeters, the bending losses may reach 0.6 dB. The losses for a bend radius of 7.5 millimeters are typically half of those for a bend radius of 5 millimeters.

A multimode optical fiber usable under the OM3 and OM4 standards coupled to a 10G-BASE-S source has, in the worst case, maximum bending losses BL equal to 1.5 dB.

FIG. 2 demonstrates that to increase the modal bandwidth to compensate bending losses it is necessary, if the optical fiber is not bent, for the modal bandwidth to have a sufficiently low system margin. In other words, the system margin must be below 3.1 minus BL. Thus, for a maximum bending loss value BL equal to 1.5 dB, the modal bandwidth is less than 3150 MHz·km. The step 92 of selecting optical fibers in which the modal bandwidth is less than 3150 MHz·km makes it possible to choose optical fibers for which the modal bandwidth BW when the optical fiber is not bent is sufficiently low to compensate bending losses in a system conforming to the OM3 or OM4 standard. The optical fiber selected in this step 92 enables compensation of bending losses if the second bandwidth value bBW when the optical fiber is bent is above the threshold A.

Bending losses depend on injection conditions. 10G-BASE-S sources can induce many injection conditions. Thus, there are sources inducing losses much lower than the maximum values given above. The losses may be higher for use in another spectral window, for example, at around 1300 nanometers. The threshold A depends on the maximum bending losses of the optical fiber when it is bent.

For example, for two turns of optical fiber with a bend radius of 5 millimeters, the second modal bandwidth value bBW is greater than 4000 MHz·km at the wavelength 850 nanometers. In another example, with two turns of optical fiber with a bend radius of 5 millimeters, the second modal bandwidth value bBW is greater than 5000 MHz·km at the wavelength 850 nanometers. In a further example, with two turns of optical fiber with a bend radius of 5 millimeters, the second modal bandwidth value bBW is greater than 6000 MHz·km at the wavelength 850 nanometers.

Figure 7:
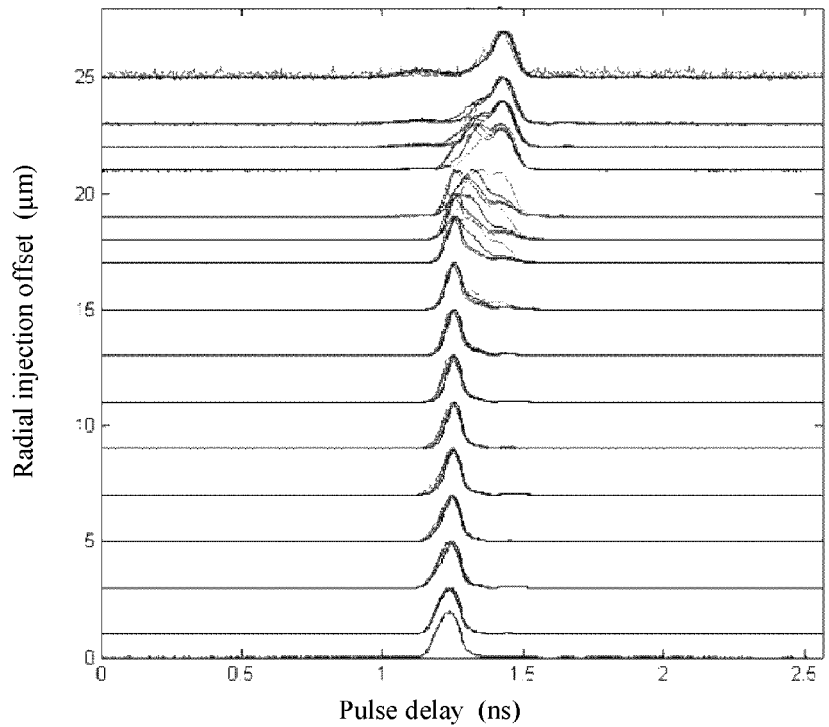
FIG. 7 shows DMD measurements acquired for a multimode optical fiber selected using a method in accordance with the present invention.
Figure 8:
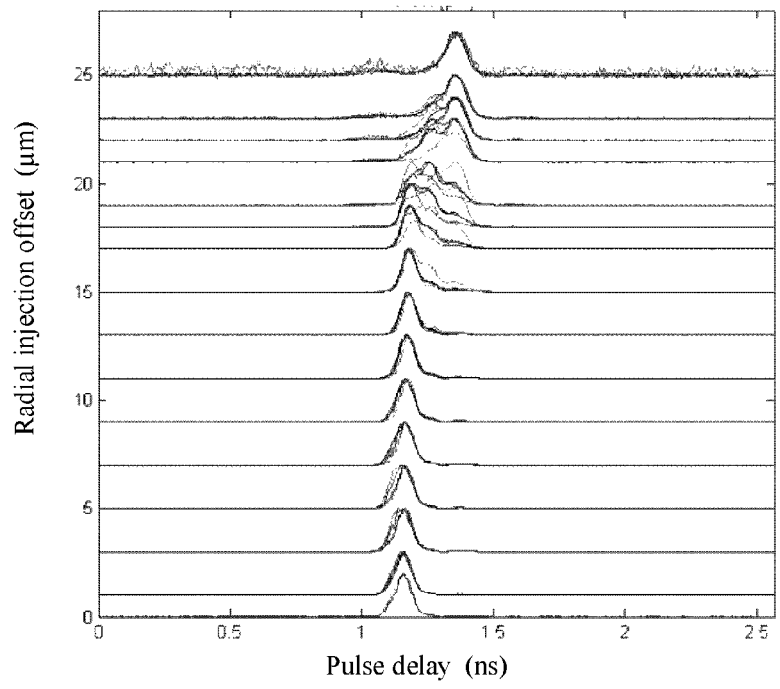
FIG. 8 shows DMD measurements acquired for another multimode optical fiber selected using a method in accordance with the present invention.
Figure 9:
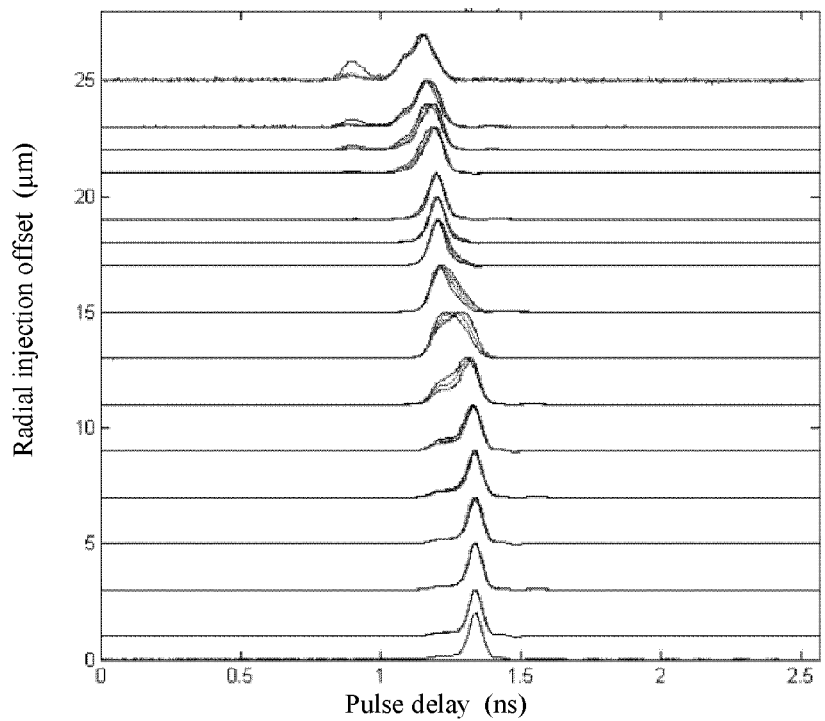
FIG. 9 shows DMD measurements acquired on a comparative optical fiber not selected using a method in accordance with the present invention.

The method of the present invention can be better understood with reference to FIGS. 7, 8, and 9, which give DMD measurements acquired on optical fibers 1, 2, 3. During measurement, the optical fibers 1, 2, and 3 were subjected to bending of two turns around a bend radius of 5 millimeters at the wavelength 850 nanometers.

FIG. 7 gives DMD measurements acquired on a first example of optical fiber, referred to as optical fiber 1, selected by an exemplary method of the invention. If optical fiber 1 is not bent, it has a calculated effective modal bandwidth (EMBc) equal to 2600 MHz·km. If optical fiber 1 is bent, it has a calculated effective modal bandwidth (bEMBc) equal to 4440 MHz·km. For radial offsets between 15 microns and 25 microns, the optical fiber suffers delays between higher order modes. However, if the optical fiber is bent the higher order modes are filtered. Thus, optical fiber 1 is able to compensate up to 0.9 dB of bending losses via its increased modal bandwidth when it is bent.

FIG. 8 shows DMD measurements acquired from another example of optical fiber, referred to as optical fiber 2, selected by an exemplary method of the invention. If optical fiber 2 is not bent, it has a calculated effective modal bandwidth (EMBc) equal to 2360 MHz·km. If optical fiber 2 is bent, it has a calculated effective modal bandwidth (bEMBc) equal to 3455 MHz·km. For radial offsets between 15 microns and 25 microns, the optical fiber suffers delays between higher order modes. However, if the optical fiber is bent the higher order modes are filtered. Thus, optical fiber 2 is able to compensate up to 0.9 dB of bending losses via its increased modal bandwidth when it is bent.

By way of comparison, FIG. 9 shows DMD measurements acquired from a comparative optical fiber 3 not selected by the method of the present invention. If this optical fiber 3 is not bent, it has a calculated effective modal bandwidth (EMBc) equal to 2340 MHz·km. If optical fiber 3 is bent, it has a calculated effective modal bandwidth (bEMBc) equal to 2440 MHz·km. For radial offsets between 15 microns and 25 microns, the optical fiber suffers a shorter delay between the higher order modes than optical fibers 1 and 2. The higher order modes are filtered if the optical fiber is bent, but the increase in the bandwidth is not sufficient to compensate bending losses. The optical fiber 3 cannot compensate 0.2 dB of bending losses at the wavelength 850 nanometers.

Thus, unlike optical fiber 3, optical fibers 1 and 2 enable non-degraded transmission of the optical signal when bent.

The present invention also embraces a multimode optical fiber having a central core and optical cladding.

Figure 11:
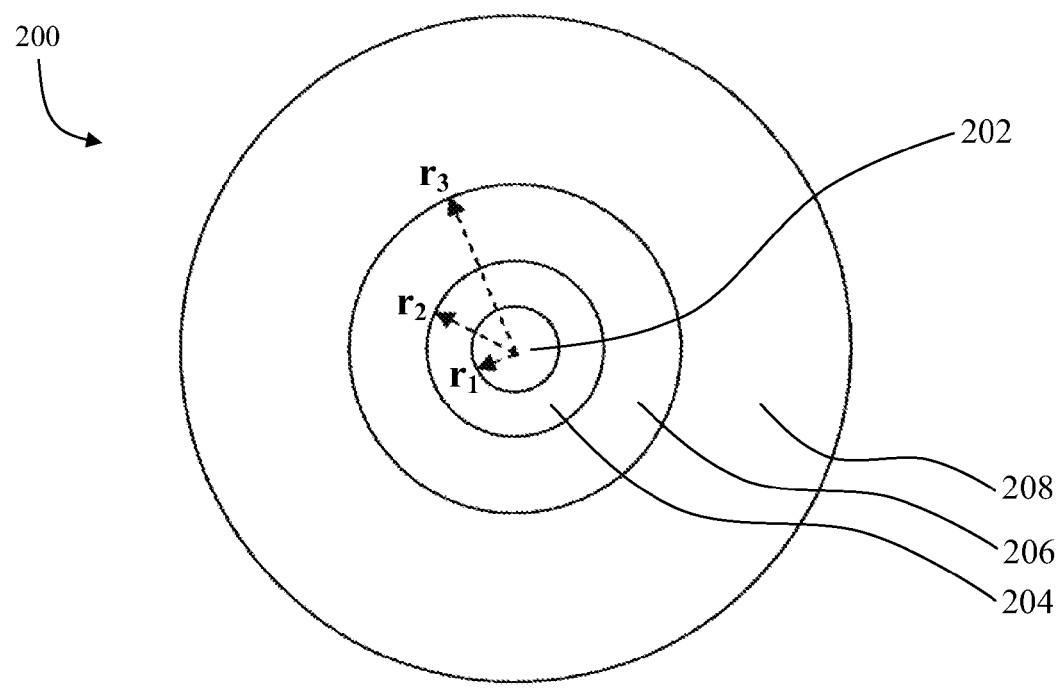
FIG. 11 schematically depicts the transverse cross-section of a multimode optical fiber having a complex index profile.

FIG. 11 shows an example of multimode optical fiber 200 having a complex index profile. The optical fiber has a central core 202, an inner cladding 204 generally having a constant index profile similar to the index of the outer cladding 208, and a trench 206 having a refractive index difference $\Delta n_t$ with respect to the outer cladding 208. This refractive index difference $\Delta n_t$ may be a function of radius r where r corresponds to the radial position with respect to the center of the optical fiber.

The refractive index profile of the central core allows the creation of special guidance properties, such as a reduction of the intermodal dispersion. In the inner cladding 204, the trench 206, and the outer cladding 208, the refractive indices are generally substantially constant over their widths, but complex profiles may be introduced to add new functions to the optical fiber.

The central core 202, which has a radius $r_2$, transmits the optical signal. The central core 202 has the standard characteristics of a multimode optical fiber, such as an alpha-shaped profile relative to the outer cladding.

The optical cladding includes an inner cladding 204 adjacent the central core 202. The inner cladding has a radius $r_2$. The difference between the radius $r_2$ of the inner cladding and the radius $r_2$ of the central core is typically between about 0.8 micron and 5 microns. This difference may be interpreted as being the thickness or width of the inner cladding.

The optical cladding also includes a trench 206 adjacent the inner cladding. The trench has a radius $r_3$, as well as a volume V of between −30 microns and −2 microns. The volume V is given by the following expression, in which $\Delta n_t$ is the refractive index difference of the trench with respect to the outer cladding as a function of the radius r, wherein r corresponds to the radial position with respect to the center of the optical fiber:

$$V = \int_{r2}^{r3} \Delta n_t \times 1000 \times dr.$$

The characteristics of the trench and the inner cladding make it possible to improve the optical fiber's bending resistance. The trench has a width and a depth such that the volume of the trench has no deleterious effects on the signal transmitted via the optical fiber. Thus, the trench does not disturb the bandwidth of the optical fiber. The trench is sufficiently small to prevent any significant guiding of leakage modes.

For example, the volume V of the trench may be between about −20 microns and −10 microns, and the difference between the radius $r_2$ of the inner cladding and the radius $r_1$ of the central core may be between 0.8 micron and 2 microns.

In some exemplary embodiments, the trench has a width, which is defined by the difference $r_3-r_2$ between the radius $r_3$ of the trench and the radius $r_2$ of the inner cladding, of between about 2 microns and 8 microns (e.g., between about 3 microns and 6 microns). The trench's refractive index difference $\Delta n_t$ with respect to the outer cladding may be less than $-0.5\times10^{-3}$ (e.g., less than $-1\times10^{-3}$), and the trench's refractive index difference $\Delta n_t$ with respect to the outer cladding may be greater than $-8\times10^{-3}$ (e.g., greater than $-5\times10^{-3}$).

The trench may be of any known type, such as a single trench. In another example, the trench is a composite trench (e.g., having a plurality of individual trenches separated from one another by inner cladding layers).

In some exemplary embodiments, the difference $r_2-r_1$ between the inner cladding's radius $r_2$ and the central core's radius $r_1$ depends on the trench's refractive index difference $\Delta n_t$. In such embodiments, the difference $r_2-r_1$ and the trench's refractive index difference $\Delta n_t$ satisfy one of the following inequalities:

$$\frac{5.6}{1000\times\Delta n_t - 2.1} + 2.03 > r_2 - r_1 \text{ OR } r_2 - r_1 > \frac{3}{100\times\Delta n_t - 0.4} + 2.$$

The foregoing assures the existence of sufficient higher order modes that are available for filtering when the multimode optical fiber is bent. The existence of these higher order modes results in a multimode optical fiber with an increased cladding effect. By way of comparison, commonly assigned U.S. Patent Publication No. US2011/0123161 A1, which is hereby incorporated by reference in its entirety, discloses a multimode optical fiber with a reduced cladding effect.

The optical fiber also has a modal bandwidth that depends on the bending to which the optical fiber is subjected. The value bBW of the modal bandwidth when the optical fiber is bent exceeds a bandwidth threshold A. The threshold A is higher than the value BW of the modal bandwidth when the optical fiber is not bent. The threshold A is a function of the value BW of the modal bandwidth when the optical fiber is not bent. The threshold A also depends on a predetermined bending loss value BL. The value BL is greater than zero and corresponds to the maximum bending losses permitted when the optical fiber is bent. Thus, the optical fiber according to the present invention is usable in an optical system for transmitting an optical signal that is not degraded by bending.

The trench makes it possible to reduce the bending losses of the optical fiber. For example, the trench makes it possible to limit the bending losses to approximately 1.2 dB for two turns around a bend radius of 5 millimeters. The trench, however, is sufficiently small to avoid deleterious effects on the refractive index profile of the optical fiber. The bending losses remain sufficiently high to enable filtering of the higher order modes. For example, the bending losses are greater than 0.5 dB (e.g., greater than 0.8 dB) with two turns around a bend radius of 5 millimeters for a signal wavelength of 850 nanometers.

In contrast, the bandwidth threshold A is as described with reference to the method of the present invention. Thus, when the optical fiber according to the present invention is bent, the corresponding bending losses are compensated, or even overcompensated, by an increase in the modal bandwidth. Compensation of bending losses is possible if the modal bandwidth value bBW of the optical fiber when it is bent exceeds the bandwidth threshold A.

Thus, exemplary multimode optical fibers include a trench that makes it possible to reduce bending losses but not to eliminate them completely. The exemplary optical fibers also have a bandwidth bBW when bent that makes it possible to maintain signal quality. Thus, the optical fiber enables transmission of an optical signal whereby the quality of the signal (i.e., its signal-to-noise ratio) is generally insensitive to bending without the deleterious effects of a large-volume trench.

In an exemplary embodiment, the threshold A satisfies the following equation, in which D is a value that depends on the modal bandwidth value BW when the optical fiber is not bent and $\alpha$ is a constant:

$$A = \frac{BW}{(1 - BL\times D)^{\frac{1}{\alpha}}}.$$

In an exemplary embodiment, the value D satisfies the following equation, in which F is a constant:

$$D = \frac{BW^\alpha}{F}.$$

In exemplary embodiments, the threshold A is obtained from the 10 Gb/s Link Budget Spreadsheet developed by the IEEE P802.3ae 10 Gb/s Working Group. In these embodiments, when bent the exemplary optical fiber has a modal bandwidth bBW above the threshold A, with $F=2\times10^8$ and $\alpha=2.4$.

In an exemplary optical-fiber embodiment, the modal bandwidth value BW when the optical fiber is not bent is less than 3150 MHz·km at the wavelength 850 nanometers. Thus, the optical fiber has a modal bandwidth when it is not bent that is sufficiently low for it to be used in a system conforming to the OM3 or OM4 standards.

The value of the threshold A is a function of the maximum bending losses when the optical fiber is bent. For example, with two turns of optical fiber with a bend radius of 5 millimeters, the bandwidth threshold A is greater than 4000 MHz·km at the wavelength 850 nanometers. In another example, with two turns of optical fiber with a bend radius of 5 millimeters, the bandwidth threshold A is greater than 5000 MHz·km at the wavelength 850 nanometers. In a further example, with two turns of optical fiber with a bend radius of 5 millimeters, the bandwidth threshold A is greater than 6000 MHz·km at the wavelength 850 nanometers.

Those having ordinary skill in the art will recognize that reducing or eliminating an optical fiber's cladding effect is typically desirable. In contrast, exemplary embodiments of multimode optical fibers according to the present invention exhibit a significant cladding effect. The radial offset bandwidth at a radial distance of 24 microns from the center of the optical fiber's central core (i.e., the ROB24 parameter) provides a good characterization of the cladding effect (i.e., a high ROB24 is indicative of a reduced cladding effect). In this regard, at a wavelength of 850 nanometers, exemplary embodiments of the multimode optical fiber have a radial offset bandwidth at 24 microns (ROB24) of less than 5,000 MHz·km (e.g., less than about 4,500 MHz·km), such as less than about 3,000 MHz·km (e.g., less than about 2,000

MHz·km). Thus, these exemplary multimode optical fibers exhibit a significant cladding effect.

Notwithstanding the foregoing, Radial Offset Bandwidth is not the only parameter that can be used to evaluate an optical fiber's suitability for high-data-rate applications. In this regard, OFL bandwidth may provide useful information regarding an optical fiber's performance. In exemplary embodiments, at a wavelength of 850 nanometers, the multimode optical fiber has an OFL bandwidth of less than 2,000 MHz·km (e.g., less than about 1,500 MHz·km).

The present invention also relates to the use of an optical fiber of the invention or an optical fiber obtained by the method of the invention as a transmission medium in an optical system, for example a fiber to the home (FTTH) system.

In particular, the invention includes the use of an optical fiber of the invention or an optical fiber obtained by the method of the invention as a transmission medium that is insensitive to bending in an optical system. The optical fiber of the invention or the optical fiber obtained by the method of the invention is advantageously used in a system insensitive to bending losses and suitable for short-distance networks.

The present invention further relates to an optical system including at least one portion of optical fiber of the invention or one portion of optical fiber obtained by the method of the invention. In particular embodiments, the optical system has a bit rate greater than or equal to 10 Gb/s over a source-receiver distance of at least 100 meters, such as at least 300 meters (e.g., at least 550 meters).

The present invention is not limited to the preceding exemplary embodiments. In particular, the threshold A may be obtained from data other than that obtained from the 10 Gb/s Link Budget Spreadsheet developed by the IEEE P802.3ae 10 Gb/s Working Group.

The optical fiber according to the present invention may be installed in numerous transmission systems with good compatibility with other optical fibers of the system.

The present optical fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the present optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns).

Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter might be worthwhile for some optical-fiber applications.

As noted, the present optical fibers may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fibers may be manufactured by drawing from final preforms.

A final preform may be manufactured by providing a primary preform with an outer overcladding layer (i.e., an overcladding process). The outer overcladding layer typically consists of doped or undoped, natural or synthetic, silica glass. Several methods are available for providing the outer overcladding layer.

In a first exemplary method, the outer overcladding layer may be provided by depositing and vitrifying natural or synthetic silica particles on the outer periphery of the primary preform under the influence of heat. Such a process is known, for example, from U.S. Pat. Nos. 5,522,007, 5,194,714, 6,269,663, and 6,202,447, each of which is hereby incorporated by reference in its entirety.

In another exemplary method, a primary preform may be overcladded using a silica sleeve tube, which may or may not be doped. This sleeve tube may then be collapsed onto the primary preform.

In yet another exemplary method, an overcladding layer may be applied via an Outside Vapor Deposition (OVD) method. Here, a soot layer is first deposited on the outer periphery of a primary preform, and then the soot layer is vitrified to form glass.

The primary preforms may be manufactured via outside vapor deposition techniques, such as Outside Vapor Deposition (OVD) and Vapor Axial Deposition (VAD). Alternatively, the primary preforms may be manufactured via inside deposition techniques in which glass layers are deposited on the inner surface of a substrate tube of doped or undoped silica glass, such as Modified Chemical Vapor Deposition (MCVD), Furnace Chemical Vapor Deposition (FCVD), and Plasma Chemical Vapor Deposition (PCVD).

By way of example, the primary preforms may be manufactured using a PCVD process, which can precisely control the central core's gradient refractive index profile.

A depressed trench, for instance, may be deposited on the inner surface of a substrate tube as part of the chemical vapor deposition process. More typically, a depressed trench may be manufactured either (i) by using a fluorine-doped substrate tube as the starting point of the internal deposition process for deposition of the gradient refractive index central core or (ii) by sleeving a fluorine-doped silica tube over the gradient refractive index central core, which itself may be produced using an outside deposition process (e.g., OVD or VAD). Accordingly, a component glass fiber manufactured from the resulting preform may have a depressed trench located at the periphery of its central core.

As noted, a primary preform may be manufactured via an inside deposition process using a fluorine-doped substrate tube. The resulting tube containing the deposited layers may be sleeved by one or more additional fluorine-doped silica tubes so as to increase the thickness of a depressed trench, or to create a depressed trench having a varying refractive index over its width. Although not required, one or more additional sleeve tubes (e.g., fluorine-doped substrate tubes) may be collapsed onto the primary preform before an overcladding step is carried out. The process of sleeving and collapsing is sometimes referred to as jacketing and may be repeated to build several glass layers on the outside of the primary preform.

The present optical fibers may be deployed in various structures, such as those exemplary structures disclosed hereinafter.

For example, one or more of the present optical fibers may be enclosed within a buffer tube. For instance, optical fiber may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical-fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less than about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary-coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation), it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished helically in one direction, known as "S" or "Z" stranding, or via Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). As will be understood by those having ordinary skill in the art, such strength yarns provide tensile strength to fiber optic cables. Likewise, strength members can be included within the buffer tube's casing.

Strength yarns may be coated with a lubricant (e.g., fluoropolymers), which may reduce unwanted attenuation in fiber optic cables (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may either tightly surround or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Pat. No. 7,515,795 for a Water-Swellable Tape, Adhesive-Backed for Coupling When Used Inside a Buffer Tube, which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Pat. No.

7,599,589 for a Gel-Free Buffer Tube with Adhesively Coupled Optical Element, which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Pat. No. 7,724,998 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Pat. No. 7,574,095 for a Communication Cable Assembly and Installation Method, (Lock et al.), and U.S. Pat. No. 7,665,902 for a Modified Pre-Ferrulized Communication Cable Assembly and Installation Method, (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the optical fiber, thereby increasing the optical fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase-shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the optical fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Pat. No. 7,995,888 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No.

US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Pat. No. 8,009,950 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Publication No. US2011/0116160 A1 for a Rare-Earth-Doped Optical Fiber Having Small Numerical Aperture, filed Nov. 11, 2010, (Boivin et al.); U.S. Patent Publication No. US2011/0123161 A1 for a High-Bandwidth, Multimode Optical Fiber with Reduced Cladding Effect, filed Nov. 24, 2010, (Molin et al.); U.S. Patent Publication No. US2011/0123162 A1 for a High-Bandwidth, Dual-Trench-Assisted Multimode Optical Fiber, filed Nov. 24, 2010, (Molin et al.); U.S. Patent Publication No. US2011/0135262 A1 for a Multimode Optical Fiber with Low Bending Losses and Reduced Cladding Effect, filed Dec. 3, 2010, (Molin et al.); U.S. Patent Publication No. US2011/0135263 A1 for a High-Bandwidth Multimode Optical Fiber Having Reduced Bending Losses, filed Dec. 3, 2010, (Molin et al.); U.S. Patent Publication No. US2011/0188826 A1 for a Non-Zero Dispersion Shifted Optical Fiber Having a Large Effective Area, filed Jan. 31, 2011, (Sillard et al.); U.S. Patent Publication No. US2011/0188823 A1 for a Non-Zero Dispersion Shifted Optical Fiber Having a Short Cutoff Wavelength, filed Jan. 31, 2011, (Sillard et al.); U.S. Patent Publication No. 2011/0217012 A1 for a Broad-Bandwidth Multimode Optical Fiber Having Reduced Bending Losses, filed Mar. 1, 2011, (Bigot-Astruc et al.); U.S. Patent Publication No. 2011/0229101 A1 for a Single-Mode Optical Fiber, filed Mar. 15, 2011, (de Montmorillon et al.); U.S. patent application Ser. No. 13/175,181 for a Single-Mode Optical Fiber, filed Jul. 1, 2011, (Bigot-Astruc et al.); and U.S. patent application Ser. No. 13/206,943 for a Method of Fabricating an Optical Fiber Preform, filed Aug. 10, 2011, (de Montmorillon et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Textured Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167

A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Patent Application Publication No. US2010/0135623 A1 for Single-Fiber Drop Cables for MDU Deployments, filed Nov. 9, 2009, (Overton); U.S. Pat. No. 8,041,167 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Pat. No. 8,041,168 for Reduced-Diameter Ribbon Cables with High-Performance Optical Fiber, filed Nov. 10, 2009, (Overton); U.S. Pat. No. 8,031,997 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Publication No. 2011/0069932 A1 for a High-Fiber-Density Optical-Fiber Cable, filed Oct. 19, 2010, (Overton et al.); U.S. Patent Publication No. 2011/0091171 A1 for an Optical-Fiber Cable Having High Fiber Count and High Fiber Density, filed Oct. 19, 2010, (Tatat et al.); U.S. Patent Publication No. 2011/0176782 A1 for a Water-Soluble Water-Blocking Element, filed Jan. 19, 2011, (Parris); U.S. patent application Ser. No. 13/096,178 for a Data-Center Cable, filed Apr. 28, 2011, (Lovie et al.); U.S. patent application Ser. No. 13/099,663 for a Bundled Fiber Optic Cables, filed May 3, 2011, (Quinn et al.); U.S. patent application Ser. No. 13/111,147 for a Curing Apparatus Employing Angled UVLEDs, filed May 19, 2011, (Molin); U.S. patent application Ser. No. 13/116,141 for a Low-Smoke and Flame-Retardant Fiber Optic Cables, filed May 26, 2011, (Lovie et al.); U.S. patent application Ser. No. 13/152,651 for a Curing Apparatus Having UV Sources That Emit Differing Ranges of UV Radiation, filed Jun. 3, 2011, (Gharbi et al.); U.S. patent application Ser. No. 13/181,762 for a Adhesively Coupled Optical Fibers and Enclosing Tape, filed Jul. 13, 2011, (Parris); U.S. patent application Ser. No. 13/206,601 for a Method and Apparatus Providing Increased UVLED Intensity, filed Aug. 10, 2011, (Overton); and U.S. patent application Ser. No. 13/222,329 for an Optical-Fiber Module Having Improved Accessibility, filed Aug. 31, 2011, (Tatat).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of selecting a multimode optical fiber, comprising:
    providing a plurality of multimode optical fibers;
    for each multimode optical fiber, determining a first modal bandwidth value BW for the multimode optical fiber as positioned (i) with a minimum bend radius of 100 millimeters or more and (ii) under a tension of less than 50 grams-force (gf);
    for each multimode optical fiber, determining a second modal bandwidth value bBW for the multimode optical fiber as positioned (i) with a minimum bend radius of less than 100 millimeters and/or (ii) under a tension of 50 grams-force (gf) or greater; and
    selecting a multimode optical fiber that has a second modal bandwidth value bBW that is greater than a bandwidth threshold A, wherein (i) the bandwidth threshold A is a function of the multimode optical fiber's first modal bandwidth value BW and a bending-loss value BL and (ii) the bandwidth threshold A is greater than the multimode optical fiber's first modal bandwidth value BW.

2. The method according to claim 1, wherein:
    the step of determining a first modal bandwidth value BW for the multimode optical fiber comprises (i) carrying out dispersion mode delay (DMD) measurements on the multimode optical fiber when the multimode optical fiber is straight and (ii) weighting the dispersion mode delay (DMD) measurements using coefficients corresponding to when the multimode optical fiber is straight; and
    the step of determining a second modal bandwidth value bBW for the multimode optical fiber comprises weighting the dispersion mode delay (DMD) measurements using coefficients corresponding to when the multimode optical fiber is bent.

3. The method according to claim 2, comprising, from the plurality of multimode optical fibers, preselecting multimode optical fibers that have bending losses exceeding a predetermined threshold before the step of determining a first modal bandwidth value BW for the multimode optical fiber.

4. The method according to claim 2, comprising, after the step of determining a first modal bandwidth value BW for the multimode optical fiber, selecting multimode optical fibers having a first modal bandwidth value BW of about 3150 MHz·km or less at a wavelength of 850 nanometers.

5. The method according to claim 2, wherein:
    the first modal bandwidth BW and/or the second modal bandwidth bBW is an effective modal bandwidth; and
    the bending losses BL are bending losses under restricted injection conditions.

6. The method according to claim 2, wherein:
    the first modal bandwidth BW and/or the second modal bandwidth bBW is a bandwidth under saturated injection conditions; and the bending losses BL are bending losses under saturated injection conditions.

7. The method according to claim 1, wherein the bandwidth threshold A satisfies the following equation:

$$A = \frac{BW}{(1 - BL \times D)^{\frac{1}{\alpha}}},$$

where:
A is the bandwidth threshold;
BW is the first modal bandwidth value of the multimode optical fiber;
BL is the predetermined bending loss value;
D is a value that is a function of the first modal bandwidth value BW of the multimode optical fiber; and
α is a constant.

8. The method according to claim 7, wherein α is 2.4.

9. The method according to claim 7, wherein the value D satisfies the following equation, in which F is a constant:

$$D = \frac{BW^{\alpha}}{F}.$$

10. The method according to claim 9, wherein F is $2 \times 10^8$.

11. The method according to claim 7, comprising, from the plurality of multimode optical fibers, preselecting multimode optical fibers that have bending losses exceeding a predetermined threshold before the step of determining a first modal bandwidth value BW for the multimode optical fiber.

12. The method according to claim 7, wherein at a wavelength of 850 nanometers, the bending-loss value BL is greater than 0.5 dB.

13. The method according to claim 7, comprising, after the step of determining a first modal bandwidth value BW for the multimode optical fiber, selecting multimode optical fibers having a first modal bandwidth value BW of about 3150 MHz·km or less at a wavelength of 850 nanometers.

14. The method according to claim 7, wherein, at a wavelength of 850 nanometers, the bandwidth threshold A is 4000 MHz·km.

15. The method according to claim 7, wherein:
the first modal bandwidth BW and/or the second modal bandwidth bBW is an effective modal bandwidth; and
the bending losses BL are bending losses under restricted injection conditions.

16. The method according to claim 7, wherein:
the first modal bandwidth BW and/or the second modal bandwidth bBW is a bandwidth under saturated injection conditions; and
the bending losses BL are bending losses under saturated injection conditions.

17. The method according to claim 1, comprising, from the plurality of multimode optical fibers, preselecting multimode optical fibers that have bending losses exceeding a predetermined threshold before the step of determining a first modal bandwidth value BW for the multimode optical fiber.

18. The method according to claim 1, wherein the step of determining a second modal bandwidth value bBW for the multimode optical fiber comprises determining the second modal bandwidth value bBW for the multimode optical fiber as positioned with at least one quarter turn around a bend radius of 10 millimeters or less.

19. The method according to claim 1, wherein the step of determining a second modal bandwidth value bBW for the multimode optical fiber comprises determining the second modal bandwidth value bBW for the multimode optical fiber as positioned with two turns around a bend radius of 5 millimeters.

20. The method according to claim 1, wherein at a wavelength of 850 nanometers, the bending-loss value BL is greater than 0.5 dB.

21. The method according to claim 1, wherein at a wavelength of 850 nanometers, the bending-loss value BL is greater than 0.8 dB.

22. The method according to claim 1, comprising, after the step of determining a first modal bandwidth value BW for the multimode optical fiber, selecting multimode optical fibers having a first modal bandwidth value BW of about 3150 MHz·km or less at a wavelength of 850 nanometers.

23. The method according to claim 1, wherein, at a wavelength of 850 nanometers, the bandwidth threshold A is 4000 MHz·km.

24. The method according to claim 1, wherein, at a wavelength of 850 nanometers, the bandwidth threshold A is 5000 MHz·km.

25. The method according to claim 1, wherein, at a wavelength of 850 nanometers, the bandwidth threshold A is 6000 MHz·km.

26. The method according to claim 1, wherein:
the first modal bandwidth BW and/or the second modal bandwidth bBW is an effective modal bandwidth; and
the bending losses BL are bending losses under restricted injection conditions.

27. The method according to claim 1, wherein:
the first modal bandwidth BW and/or the second modal bandwidth bBW is a bandwidth under saturated injection conditions; and
the bending losses BL are bending losses under saturated injection conditions.

* * * * *